US008724803B2

(12) United States Patent
Semple et al.

(10) Patent No.: US 8,724,803 B2
(45) Date of Patent: May 13, 2014

(54) METHOD AND APPARATUS FOR PROVIDING AUTHENTICATED CHALLENGES FOR BROADCAST-MULTICAST COMMUNICATIONS IN A COMMUNICATION SYSTEM

(75) Inventors: James Semple, London (GB); Gregory Gordon Rose, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 10/932,514

(22) Filed: Sep. 1, 2004

(65) Prior Publication Data

US 2005/0138379 A1 Jun. 23, 2005

Related U.S. Application Data

(60) Provisional application No. 60/499,563, filed on Sep. 2, 2003, provisional application No. 60/502,866, filed on Sep. 11, 2003.

(51) Int. Cl.
*H04L 9/00* (2006.01)
*H04L 9/08* (2006.01)
*H04L 29/06* (2006.01)
*H04L 9/32* (2006.01)

(52) U.S. Cl.
USPC ............. 380/44; 713/151; 713/160; 713/161; 713/163; 713/176; 713/178; 713/180; 713/182; 726/2; 726/3; 726/6; 726/9; 726/26; 726/29; 380/47; 380/277; 380/278; 380/279; 380/282

(58) Field of Classification Search
USPC ........ 713/163, 176, 277–278; 380/44; 726/26
See application file for complete search history.

(56) References Cited

U.S. PATENT DOCUMENTS

| 4,163,255 A | 7/1979 | Pires |
| 4,323,921 A | 4/1982 | Guillou |

(Continued)

FOREIGN PATENT DOCUMENTS

| CA | 2308405 A1 | 11/2000 |
| CN | 1256599 A | 6/2000 |

(Continued)

OTHER PUBLICATIONS

Alain Pannetrat et al, Authenticating Realtime Packet Streams and Multicasts, 2002 IEEE.*

(Continued)

*Primary Examiner* — Kambiz Zand
*Assistant Examiner* — Jenise E Jackson
(74) *Attorney, Agent, or Firm* — Michael Johnson

(57) ABSTRACT

A method and apparatus for secure generation of a short-term key SK for viewing information content in a Multicast-broadcast-multimedia system are described. A short-term key is generated by a memory module residing in user equipment (UE) only when the source of the information used to generate the short-term key can be validated. A short-term key can be generated by a Broadcast Access Key (BAK) or a derivative of BAK and a changing value with a Message Authentication Code (MAC) appended to the changing value. A short-term key (SK) can also be generated by using a private key and a short-term key (SK) manager with a corresponding public key distributed to the memory module residing in the user equipment (UE), using a digital signature.

26 Claims, 7 Drawing Sheets

(56) References Cited

U.S. PATENT DOCUMENTS

| | | | |
|---|---|---|---|
| 4,336,612 A | 6/1982 | Inoue et al. | |
| 4,750,167 A | 6/1988 | Meyer | |
| 4,870,408 A | 9/1989 | Zdunek et al. | |
| 4,881,263 A | 11/1989 | Herbison et al. | |
| 4,901,307 A | 2/1990 | Gilhousen et al. | |
| RE33,189 E | 3/1990 | Lee et al. | |
| 4,924,513 A | 5/1990 | Herbison et al. | |
| 5,052,000 A | 9/1991 | Wang et al. | |
| 5,056,109 A | 10/1991 | Gilhousen et al. | |
| 5,101,501 A | 3/1992 | Gilhousen et al. | |
| 5,103,459 A | 4/1992 | Gilhousen et al. | |
| 5,117,457 A | 5/1992 | Comerford et al. | |
| 5,136,586 A | 8/1992 | Greenblatt | |
| 5,150,412 A | 9/1992 | Maru | |
| 5,159,447 A | 10/1992 | Haskell et al. | |
| 5,164,988 A | 11/1992 | Matyas et al. | |
| 5,235,631 A | 8/1993 | Grube et al. | |
| 5,237,612 A * | 8/1993 | Raith | 380/247 |
| 5,241,598 A * | 8/1993 | Raith | 380/248 |
| 5,253,294 A | 10/1993 | Maurer | |
| 5,257,396 A | 10/1993 | Auld, Jr. et al. | |
| 5,325,357 A | 6/1994 | Kimoto et al. | |
| 5,351,087 A | 9/1994 | Christopher et al. | |
| 5,353,332 A | 10/1994 | Raith et al. | |
| 5,363,379 A | 11/1994 | Eckenrode et al. | |
| 5,365,572 A | 11/1994 | Saegusa et al. | |
| 5,369,784 A | 11/1994 | Nelson | |
| 5,371,794 A | 12/1994 | Diffie et al. | 380/21 |
| 5,404,563 A | 4/1995 | Green et al. | |
| 5,410,602 A | 4/1995 | Finkelstein et al. | |
| 5,412,655 A | 5/1995 | Yamada et al. | |
| 5,421,006 A | 5/1995 | Jablon et al. | |
| 5,442,626 A | 8/1995 | Wei | |
| 5,448,568 A | 9/1995 | Delpuch et al. | |
| 5,467,398 A | 11/1995 | Pierce et al. | |
| 5,473,609 A | 12/1995 | Chaney | |
| 5,473,642 A | 12/1995 | Osawa et al. | |
| 5,481,613 A | 1/1996 | Ford et al. | |
| 5,485,577 A | 1/1996 | Eyer et al. | |
| 5,504,773 A | 4/1996 | Padovani et al. | |
| 5,513,245 A | 4/1996 | Mizikovsky et al. | |
| 5,515,441 A | 5/1996 | Faucher | |
| 5,537,474 A | 7/1996 | Brown et al. | |
| 5,565,909 A | 10/1996 | Thibadeau et al. | |
| 5,592,470 A | 1/1997 | Rudrapatna et al. | |
| 5,659,556 A | 8/1997 | Denissen et al. | |
| 5,673,259 A | 9/1997 | Quick, Jr. | |
| 5,686,963 A | 11/1997 | Uz et al. | |
| 5,708,961 A | 1/1998 | Hylton et al. | |
| 5,729,540 A | 3/1998 | Wegrzyn | |
| 5,740,246 A | 4/1998 | Saito | |
| 5,748,736 A * | 5/1998 | Mittra | 713/163 |
| 5,751,707 A | 5/1998 | Voit et al. | |
| 5,751,725 A | 5/1998 | Chen | |
| 5,758,068 A | 5/1998 | Brandt et al. | |
| 5,758,291 A | 5/1998 | Grube et al. | |
| 5,768,276 A | 6/1998 | Diachina et al. | |
| 5,774,496 A | 6/1998 | Butler et al. | |
| 5,778,059 A | 7/1998 | Loghmani et al. | |
| 5,778,069 A | 7/1998 | Thomlinson et al. | |
| 5,778,187 A | 7/1998 | Monteiro et al. | |
| 5,787,347 A | 7/1998 | Yu et al. | |
| 5,796,829 A | 8/1998 | Newby et al. | |
| 5,835,730 A | 11/1998 | Grossman et al. | |
| 5,850,444 A | 12/1998 | Rune | |
| 5,850,445 A | 12/1998 | Chan et al. | |
| 5,870,474 A | 2/1999 | Wasilewski et al. | |
| 5,878,141 A | 3/1999 | Daly et al. | |
| 5,881,368 A | 3/1999 | Grob et al. | |
| 5,884,196 A | 3/1999 | Lekven et al. | |
| 5,887,252 A | 3/1999 | Noneman | |
| 5,909,491 A | 6/1999 | Luo | |
| 5,923,649 A | 7/1999 | Raith | |
| 5,936,965 A | 8/1999 | Doshi et al. | |
| 5,940,507 A | 8/1999 | Cane et al. | |
| 5,946,316 A | 8/1999 | Chen et al. | |
| 5,956,404 A | 9/1999 | Schneier et al. | |
| 5,956,681 A | 9/1999 | Yamakita | |
| 5,970,072 A | 10/1999 | Gammenthaler, Jr. et al. | |
| 5,970,417 A | 10/1999 | Toyryla et al. | |
| 5,978,386 A | 11/1999 | Hamalainen et al. | |
| 5,983,099 A | 11/1999 | Yao et al. | |
| 5,983,388 A | 11/1999 | Friedman et al. | |
| 5,990,928 A | 11/1999 | Sklar et al. | |
| 5,991,400 A | 11/1999 | Kamperman | |
| 5,991,407 A | 11/1999 | Murto | |
| 6,006,073 A | 12/1999 | Glauner et al. | |
| 6,014,765 A | 1/2000 | Maeda et al. | |
| 6,018,360 A | 1/2000 | Stewart et al. | |
| 6,021,124 A | 2/2000 | Haartsen | |
| 6,026,165 A | 2/2000 | Marino et al. | |
| 6,032,197 A | 2/2000 | Birdwell et al. | |
| 6,044,154 A | 3/2000 | Kelly | |
| 6,047,071 A | 4/2000 | Shah | |
| 6,047,395 A | 4/2000 | Zook | |
| 6,052,812 A | 4/2000 | Chen et al. | |
| 6,055,236 A | 4/2000 | Nessett et al. | |
| 6,055,314 A | 4/2000 | Spies et al. | |
| 6,058,289 A | 5/2000 | Gardner et al. | |
| 6,065,061 A | 5/2000 | Blahut et al. | |
| 6,067,290 A | 5/2000 | Paulraj et al. | |
| 6,073,122 A | 6/2000 | Wool | |
| 6,081,907 A | 6/2000 | Witty et al. | |
| 6,097,817 A | 8/2000 | Bilgic et al. | |
| 6,098,878 A | 8/2000 | Dent et al. | |
| 6,108,424 A | 8/2000 | Pitiot | |
| 6,108,706 A | 8/2000 | Birdwell et al. | |
| 6,111,866 A | 8/2000 | Kweon et al. | |
| 6,122,763 A | 9/2000 | Pyndiah et al. | |
| 6,128,389 A | 10/2000 | Chan et al. | |
| 6,128,490 A | 10/2000 | Shaheen et al. | |
| 6,148,010 A | 11/2000 | Sutton et al. | |
| 6,157,719 A | 12/2000 | Wasilewski et al. | |
| 6,172,972 B1 | 1/2001 | Birdwell et al. | |
| 6,185,430 B1 | 2/2001 | Yee et al. | |
| 6,195,546 B1 | 2/2001 | Leung et al. | |
| 6,199,161 B1 | 3/2001 | Ahvenainen | |
| 6,201,961 B1 | 3/2001 | Schindall et al. | |
| 6,208,634 B1 | 3/2001 | Boulos et al. | |
| 6,230,024 B1 | 5/2001 | Wang et al. | |
| 6,233,234 B1 | 5/2001 | Curry et al. | |
| 6,233,341 B1 | 5/2001 | Riggins | |
| 6,240,091 B1 | 5/2001 | Ginzboorg et al. | |
| 6,253,069 B1 | 6/2001 | Mankovitz | |
| 6,253,326 B1 | 6/2001 | Lincke et al. | |
| 6,256,509 B1 | 7/2001 | Tanaka et al. | |
| 6,266,420 B1 | 7/2001 | Langford et al. | |
| 6,272,632 B1 | 8/2001 | Carman et al. | |
| 6,295,361 B1 * | 9/2001 | Kadansky et al. | 380/278 |
| 6,310,661 B1 | 10/2001 | Arsenault | |
| 6,314,095 B1 | 11/2001 | Loa | |
| 6,343,280 B2 | 1/2002 | Clark | |
| 6,345,307 B1 | 2/2002 | Booth | |
| 6,353,614 B1 | 3/2002 | Borella et al. | |
| 6,363,242 B1 | 3/2002 | Brown, Jr. et al. | |
| 6,363,480 B1 | 3/2002 | Perlman | |
| 6,366,776 B1 | 4/2002 | Wright et al. | |
| 6,373,829 B1 | 4/2002 | Vilmur | |
| 6,374,103 B1 | 4/2002 | Kamel et al. | |
| 6,377,810 B1 | 4/2002 | Geiger et al. | |
| 6,385,200 B1 | 5/2002 | Erami et al. | |
| 6,385,461 B1 | 5/2002 | Raith | |
| 6,415,312 B1 | 7/2002 | Boivie | |
| 6,424,717 B1 | 7/2002 | Pinder et al. | |
| 6,424,947 B1 | 7/2002 | Tsuria et al. | |
| 6,434,367 B1 | 8/2002 | Kumar et al. | |
| 6,438,612 B1 | 8/2002 | Ylonen et al. | |
| 6,449,491 B1 | 9/2002 | Dailey | |
| 6,460,156 B1 | 10/2002 | Laukkanen et al. | |
| 6,463,155 B1 | 10/2002 | Akiyama et al. | |
| 6,473,419 B1 | 10/2002 | Gray et al. | |
| 6,473,858 B1 * | 10/2002 | Shimomura et al. | 713/150 |
| 6,477,377 B2 | 11/2002 | Backstrom et al. | |
| 6,490,259 B1 | 12/2002 | Agrawal et al. | |

(56) References Cited

U.S. PATENT DOCUMENTS

| | | |
|---|---|---|
| 6,502,140 B1 | 12/2002 | Boivie |
| 6,507,590 B1 | 1/2003 | Terho et al. |
| 6,510,515 B1 | 1/2003 | Raith |
| RE38,007 E | 2/2003 | Tsukamoto et al. |
| 6,519,266 B1 | 2/2003 | Manning et al. |
| 6,523,069 B1 | 2/2003 | Luczycki et al. |
| 6,529,740 B1 | 3/2003 | Ganucheau, Jr. et al. |
| 6,536,041 B1 | 3/2003 | Knudson et al. |
| 6,538,996 B1 | 3/2003 | West et al. |
| 6,539,242 B1 | 3/2003 | Bayley |
| 6,542,490 B1 | 4/2003 | Ahmadvand et al. |
| 6,542,504 B1 | 4/2003 | Mahler et al. |
| 6,549,771 B2 | 4/2003 | Chang et al. |
| 6,560,206 B1 | 5/2003 | Naden et al. |
| 6,564,211 B1 | 5/2003 | Andreev et al. |
| 6,567,914 B1 | 5/2003 | Just et al. |
| 6,571,109 B1 | 5/2003 | Kim |
| 6,574,211 B2 | 6/2003 | Padovani et al. |
| 6,577,734 B1 | 6/2003 | Etzel et al. |
| 6,577,848 B1 | 6/2003 | Gregg et al. |
| 6,580,756 B1 | 6/2003 | Matsui et al. |
| 6,598,203 B1 | 7/2003 | Tang |
| 6,600,745 B1 | 7/2003 | Chopping |
| 6,601,068 B1 | 7/2003 | Park |
| 6,603,857 B1 | 8/2003 | Batten-Carew et al. |
| 6,606,706 B1 | 8/2003 | Li |
| 6,608,841 B1 | 8/2003 | Koodli |
| 6,614,804 B1 | 9/2003 | McFadden et al. |
| 6,633,979 B1 | 10/2003 | Smeets |
| 6,640,094 B1 | 10/2003 | Tabeta |
| 6,647,000 B1 | 11/2003 | Persson et al. |
| 6,654,384 B1 | 11/2003 | Reza et al. |
| 6,658,463 B1 * | 12/2003 | Dillon et al. .................. 709/219 |
| 6,658,605 B1 | 12/2003 | Yoshida et al. |
| 6,665,718 B1 | 12/2003 | Chuah et al. |
| 6,678,856 B1 | 1/2004 | Jordan et al. |
| 6,680,920 B1 | 1/2004 | Wan |
| 6,690,795 B1 | 2/2004 | Richards |
| 6,704,368 B1 | 3/2004 | Nefedov |
| 6,704,369 B1 | 3/2004 | Kawasaki et al. |
| 6,707,801 B2 | 3/2004 | Hsu |
| 6,711,182 B1 | 3/2004 | Gibbs et al. |
| 6,714,650 B1 | 3/2004 | Maillard et al. |
| 6,714,784 B1 | 3/2004 | Forssell et al. |
| 6,721,805 B1 | 4/2004 | Bhagwat et al. |
| 6,725,459 B2 | 4/2004 | Bacon |
| 6,728,226 B1 | 4/2004 | Naito |
| 6,731,936 B2 | 5/2004 | Chen et al. |
| 6,735,177 B1 | 5/2004 | Suzuki |
| 6,735,190 B1 | 5/2004 | Chuah et al. |
| 6,738,942 B1 | 5/2004 | Sridharan et al. |
| 6,751,218 B1 | 6/2004 | Hagirahim et al. |
| 6,760,602 B2 | 7/2004 | Tangorra et al. |
| 6,760,752 B1 | 7/2004 | Liu et al. |
| 6,763,025 B2 | 7/2004 | Leatherbury et al. |
| 6,765,909 B1 | 7/2004 | Sen et al. |
| 6,766,024 B1 | 7/2004 | Rix |
| 6,775,303 B1 | 8/2004 | Rustad et al. |
| 6,781,999 B2 | 8/2004 | Eyuboglu et al. |
| 6,788,681 B1 | 9/2004 | Hurren et al. |
| 6,792,048 B1 | 9/2004 | Lee et al. |
| 6,798,791 B1 | 9/2004 | Riazi et al. |
| 6,801,508 B1 | 10/2004 | Lim |
| 6,804,520 B1 | 10/2004 | Johansson et al. |
| 6,810,499 B2 | 10/2004 | Sridharan et al. |
| 6,819,930 B1 | 11/2004 | Laroia et al. |
| 6,826,406 B1 | 11/2004 | Vialen et al. |
| 6,829,741 B1 | 12/2004 | Khansari et al. |
| 6,831,910 B1 | 12/2004 | Moon et al. |
| 6,832,314 B1 | 12/2004 | Irvin |
| 6,856,800 B1 | 2/2005 | Henry et al. |
| 6,862,684 B1 * | 3/2005 | DiGiorgio .................. 713/163 |
| 6,870,923 B2 | 3/2005 | Yi |
| 6,879,573 B1 | 4/2005 | Huo |
| 6,879,690 B2 * | 4/2005 | Faccin et al. .................. 380/247 |
| 6,882,850 B2 | 4/2005 | McConnell et al. |
| 6,882,860 B1 | 4/2005 | Kim |
| 6,885,874 B2 | 4/2005 | Grube et al. |
| 6,888,899 B2 | 5/2005 | Raleigh et al. |
| 6,895,216 B2 | 5/2005 | Sato et al. |
| 6,895,546 B2 | 5/2005 | Ivry |
| 6,898,285 B1 | 5/2005 | Hutchings et al. |
| 6,898,640 B1 | 5/2005 | Kurita et al. |
| 6,909,702 B2 | 6/2005 | Leung et al. |
| 6,915,272 B1 | 7/2005 | Zilliacus et al. |
| 6,918,035 B1 | 7/2005 | Patel |
| 6,920,119 B2 | 7/2005 | Rinchiuso |
| 6,925,285 B2 | 8/2005 | Kim |
| 6,944,763 B1 | 9/2005 | Asano et al. |
| 6,952,454 B1 | 10/2005 | Jalali et al. |
| 6,956,833 B1 | 10/2005 | Yukie et al. |
| 6,959,384 B1 * | 10/2005 | Serret-Avila .................. 713/176 |
| 6,963,544 B1 | 11/2005 | Balachandran et al. |
| 6,970,689 B2 | 11/2005 | Khorram |
| 6,978,143 B1 | 12/2005 | Vialen |
| 6,983,410 B2 | 1/2006 | Chen et al. |
| 6,987,982 B2 | 1/2006 | Willenegger et al. |
| 6,990,680 B1 | 1/2006 | Wugofski |
| 7,016,351 B1 | 3/2006 | Farinacci et al. |
| 7,024,616 B2 | 4/2006 | Ohira et al. |
| 7,031,666 B2 | 4/2006 | Hsu |
| 7,036,023 B2 | 4/2006 | Fries et al. |
| 7,039,180 B1 | 5/2006 | Issaa et al. |
| 7,046,672 B2 | 5/2006 | Liao et al. |
| 7,058,809 B2 | 6/2006 | White et al. |
| 7,069,436 B1 | 6/2006 | Akachi |
| 7,072,865 B2 | 7/2006 | Akiyama |
| 7,079,502 B2 | 7/2006 | Yamano et al. |
| 7,079,523 B2 | 7/2006 | Nelson, Jr. et al. |
| 7,096,355 B1 | 8/2006 | Marvit et al. |
| 7,114,175 B2 | 9/2006 | Lahteenmaki |
| 7,116,892 B2 | 10/2006 | Wajs |
| 7,133,353 B2 | 11/2006 | Sourour et al. |
| 7,134,019 B2 | 11/2006 | Shelest et al. |
| 7,177,424 B1 | 2/2007 | Furuya et al. |
| 7,181,620 B1 * | 2/2007 | Hur .................. 713/171 |
| 7,184,789 B2 | 2/2007 | Leung et al. |
| 7,197,072 B1 | 3/2007 | Hsu et al. |
| 7,200,230 B2 | 4/2007 | Knauft |
| 7,203,314 B1 | 4/2007 | Kahn et al. |
| 7,209,459 B2 | 4/2007 | Kangas |
| 7,215,775 B2 | 5/2007 | Noguchi et al. |
| 7,219,291 B2 | 5/2007 | Adde et al. |
| 7,237,108 B2 | 6/2007 | Medvinsky et al. |
| 7,239,704 B1 | 7/2007 | Maillard et al. |
| 7,266,687 B2 | 9/2007 | Sowa et al. |
| 7,278,164 B2 | 10/2007 | Raiz et al. |
| 7,280,660 B2 | 10/2007 | Salo et al. |
| 7,290,063 B2 | 10/2007 | Kalliokulju et al. |
| 7,301,968 B2 | 11/2007 | Haran et al. |
| 7,308,100 B2 | 12/2007 | Bender et al. |
| 7,349,425 B2 | 3/2008 | Leung et al. |
| 7,352,868 B2 | 4/2008 | Hawkes et al. |
| 7,376,963 B2 | 5/2008 | Kato et al. |
| 7,599,655 B2 | 10/2009 | Agashe et al. |
| 7,649,829 B2 | 1/2010 | Chen et al. |
| 7,669,104 B2 | 2/2010 | Uchida et al. |
| 7,693,508 B2 | 4/2010 | Leung et al. |
| 7,697,523 B2 | 4/2010 | Leung et al. |
| 7,742,781 B2 | 6/2010 | Chen et al. |
| 7,792,074 B2 | 9/2010 | Chen et al. |
| 8,077,679 B2 | 12/2011 | Leung |
| 8,098,818 B2 | 1/2012 | Grilli et al. |
| 8,121,296 B2 | 2/2012 | Hawkes et al. |
| 2001/0004761 A1 | 6/2001 | Zehavi |
| 2001/0034254 A1 | 10/2001 | Ranta et al. |
| 2001/0036200 A1 | 11/2001 | Nelson et al. |
| 2001/0036834 A1 | 11/2001 | Das et al. |
| 2001/0055298 A1 | 12/2001 | Baker et al. |
| 2002/0002541 A1 | 1/2002 | Williams |
| 2002/0002674 A1 | 1/2002 | Grimes et al. |
| 2002/0010681 A1 | 1/2002 | Hillegass et al. |
| 2002/0014159 A1 | 2/2002 | Tatsumi et al. |
| 2002/0023165 A1 | 2/2002 | Lahr |

(56) References Cited

U.S. PATENT DOCUMENTS

| | | |
|---|---|---|
| 2002/0071558 A1 | 6/2002 | Patel |
| 2002/0076195 A1 | 6/2002 | Nakajima et al. |
| 2002/0080887 A1 | 6/2002 | Jeong et al. |
| 2002/0091931 A1 | 7/2002 | Quick, Jr. et al. |
| 2002/0102964 A1* | 8/2002 | Park .................... 455/411 |
| 2002/0114469 A1 | 8/2002 | Faccin et al. |
| 2002/0141371 A1 | 10/2002 | Hsu |
| 2002/0141591 A1 | 10/2002 | Hawkes et al. |
| 2002/0169724 A1 | 11/2002 | Moroney et al. |
| 2002/0181423 A1 | 12/2002 | Chen et al. |
| 2003/0014685 A1 | 1/2003 | Chong et al. |
| 2003/0018891 A1 | 1/2003 | Hall et al. |
| 2003/0028805 A1 | 2/2003 | Lahteenmaki |
| 2003/0030581 A1* | 2/2003 | Roy .................... 342/36 |
| 2003/0031322 A1* | 2/2003 | Beckmann et al. .......... 380/278 |
| 2003/0035389 A1 | 2/2003 | Chen et al. |
| 2003/0039237 A1 | 2/2003 | Forslow |
| 2003/0039361 A1 | 2/2003 | Hawkes et al. ............ 380/278 |
| 2003/0054807 A1 | 3/2003 | Hsu et al. |
| 2003/0072384 A1 | 4/2003 | Chen et al. |
| 2003/0087653 A1* | 5/2003 | Leung et al. ............ 455/502 |
| 2003/0101401 A1 | 5/2003 | Salvi et al. |
| 2003/0123669 A1* | 7/2003 | Koukoulidis et al. ........ 380/281 |
| 2003/0126440 A1* | 7/2003 | Go et al. ............... 713/168 |
| 2003/0134655 A1 | 7/2003 | Chen et al. |
| 2003/0135748 A1* | 7/2003 | Yamada et al. ............ 713/193 |
| 2003/0157952 A1 | 8/2003 | Sarkkinen et al. |
| 2003/0159029 A1 | 8/2003 | Brown et al. |
| 2003/0217057 A1 | 11/2003 | Kuroiwa et al. |
| 2004/0019787 A1 | 1/2004 | Shibata |
| 2004/0022216 A1 | 2/2004 | Shi |
| 2004/0095515 A1 | 5/2004 | Tajima |
| 2004/0101138 A1 | 5/2004 | Revital et al. |
| 2004/0107350 A1 | 6/2004 | Wasilewski et al. |
| 2004/0120527 A1 | 6/2004 | Hawkes et al. |
| 2004/0131185 A1 | 7/2004 | Kakumer |
| 2004/0132402 A1 | 7/2004 | Agashe et al. |
| 2004/0151317 A1* | 8/2004 | Hyyppa et al. ............ 380/277 |
| 2004/0199474 A1* | 10/2004 | Ritter .................... 705/65 |
| 2004/0202329 A1 | 10/2004 | Jung et al. |
| 2004/0243808 A1* | 12/2004 | Ishiguro et al. ........... 713/176 |
| 2004/0266391 A1 | 12/2004 | Hafren |
| 2005/0008159 A1 | 1/2005 | Grilli et al. |
| 2005/0010774 A1 | 1/2005 | Rose et al. |
| 2005/0048963 A1 | 3/2005 | Kubler et al. |
| 2005/0055551 A1 | 3/2005 | Becker et al. |
| 2005/0063544 A1* | 3/2005 | Uusitalo et al. ............ 380/277 |
| 2005/0108563 A1 | 5/2005 | Becker et al. |
| 2005/0144550 A1 | 6/2005 | Jeon et al. |
| 2005/0165711 A1* | 7/2005 | Hamatsu .................... 707/1 |
| 2005/0216731 A1 | 9/2005 | Saito et al. |
| 2005/0238315 A1 | 10/2005 | Kataoka |
| 2005/0271210 A1 | 12/2005 | Soppera |
| 2006/0078000 A1 | 4/2006 | Rinne et al. |
| 2006/0168446 A1* | 7/2006 | Ahonen et al. ............ 713/163 |
| 2006/0171540 A1 | 8/2006 | Lee et al. |
| 2006/0242412 A1 | 10/2006 | Jung et al. |
| 2007/0038610 A1 | 2/2007 | Omoigui |
| 2007/0116282 A1 | 5/2007 | Hawkes et al. |
| 2007/0214482 A1 | 9/2007 | Nguyen |
| 2007/0280169 A1* | 12/2007 | Cam Winget ............ 370/331 |
| 2008/0226073 A1 | 9/2008 | Hawkes et al. |
| 2010/0048206 A1 | 2/2010 | Agashe et al. |
| 2010/0107041 A1 | 4/2010 | Chen et al. |
| 2010/0142432 A1 | 6/2010 | Leung et al. |
| 2010/0272124 A1 | 10/2010 | Chen et al. |
| 2011/0045864 A1 | 2/2011 | Chen et al. |

FOREIGN PATENT DOCUMENTS

| | | |
|---|---|---|
| CN | 1281561 A | 1/2001 |
| EP | 0636963 A2 | 2/1995 |
| EP | 0702477 A2 | 3/1996 |
| EP | 0748058 A2 | 12/1996 |
| EP | 0813309 A2 | 12/1997 |
| EP | 0854618 A2 | 7/1998 |
| EP | 0924989 A1 | 6/1999 |
| EP | 0928084 A2 | 7/1999 |
| EP | 0951198 A2 | 10/1999 |
| EP | 0993128 A1 | 4/2000 |
| EP | 0999656 A1 | 5/2000 |
| EP | 1001570 A2 | 5/2000 |
| EP | 1024661 A2 | 8/2000 |
| EP | 1030484 A2 | 8/2000 |
| EP | 1032150 A2 | 8/2000 |
| EP | 1071296 A1 | 1/2001 |
| EP | 1075118 A2 | 2/2001 |
| EP | 1075123 A1 | 2/2001 |
| EP | 1098446 A2 | 5/2001 |
| EP | 1117204 A2 | 7/2001 |
| EP | 1134951 A2 | 9/2001 |
| EP | 1143635 A1 | 10/2001 |
| EP | 1185125 A1 | 3/2002 |
| EP | 1190526 A1 | 3/2002 |
| EP | 1213943 A1 | 6/2002 |
| EP | 1248188 A1 | 10/2002 |
| EP | 1374477 A1 | 1/2004 |
| EP | 2204940 | 7/2010 |
| GB | 2346512 A | 8/2009 |
| JP | 1101042 | 4/1989 |
| JP | 2090840 A | 3/1990 |
| JP | 03179841 | 5/1991 |
| JP | 05216411 A | 8/1993 |
| JP | 06125554 | 5/1994 |
| JP | 7115414 | 5/1995 |
| JP | 7193569 | 7/1995 |
| JP | 7288798 | 10/1995 |
| JP | 9135478 A | 5/1997 |
| JP | 10023529 A | 1/1998 |
| JP | 10051380 A | 2/1998 |
| JP | 10063598 A | 3/1998 |
| JP | 10093547 | 4/1998 |
| JP | 10191459 | 7/1998 |
| JP | 10200536 | 7/1998 |
| JP | 10214233 | 8/1998 |
| JP | 10271041 | 10/1998 |
| JP | 10240826 | 11/1998 |
| JP | 10512428 | 11/1998 |
| JP | 11110401 A | 4/1999 |
| JP | 11127468 | 5/1999 |
| JP | 11136669 A | 5/1999 |
| JP | 11161167 | 6/1999 |
| JP | 11243569 | 9/1999 |
| JP | 11510668 T | 9/1999 |
| JP | 11313059 A | 11/1999 |
| JP | 11331070 A | 11/1999 |
| JP | 11331150 A | 11/1999 |
| JP | 11513853 | 11/1999 |
| JP | 11345179 A | 12/1999 |
| JP | 11355460 A | 12/1999 |
| JP | 11355858 A | 12/1999 |
| JP | 2000040064 A | 2/2000 |
| JP | 2000078555 A | 3/2000 |
| JP | 2000115860 A | 4/2000 |
| JP | 2000134193 | 5/2000 |
| JP | 2000137551 A | 5/2000 |
| JP | 2000138632 A | 5/2000 |
| JP | 2000183968 A | 6/2000 |
| JP | 2000196546 A | 7/2000 |
| JP | 2000196673 A | 7/2000 |
| JP | 2000224648 A | 8/2000 |
| JP | 2000244603 A | 9/2000 |
| JP | 2000253065 A | 9/2000 |
| JP | 2000253459 A | 9/2000 |
| JP | 2000261374 A | 9/2000 |
| JP | 2000269959 | 9/2000 |
| JP | 2000511733 T | 9/2000 |
| JP | 2000287192 | 10/2000 |
| JP | 2000295541 | 10/2000 |
| JP | 2000513519 | 10/2000 |
| JP | 2000324155 A | 11/2000 |
| JP | 2001007759 A | 1/2001 |
| JP | 2001007800 | 1/2001 |

(56) References Cited

FOREIGN PATENT DOCUMENTS

| | | |
|---|---|---|
| JP | 2001016253 A | 1/2001 |
| JP | 2001500327 | 1/2001 |
| JP | 200136941 | 2/2001 |
| JP | 2001036466 A | 2/2001 |
| JP | 2001045100 A | 2/2001 |
| JP | 2001053675 A | 2/2001 |
| JP | 2001077859 | 3/2001 |
| JP | 2001077859 A | 3/2001 |
| JP | 2001119340 A | 4/2001 |
| JP | 2001134193 | 5/2001 |
| JP | 2001136507 A | 5/2001 |
| JP | 2001177513 A | 6/2001 |
| JP | 2001177523 A | 6/2001 |
| JP | 2001177564 A | 6/2001 |
| JP | 2001510970 | 8/2001 |
| JP | 2001512842 | 8/2001 |
| JP | 2001268535 A | 9/2001 |
| JP | 2001513587 | 9/2001 |
| JP | 2001333032 A | 11/2001 |
| JP | 2001522164 T | 11/2001 |
| JP | 2002026835 | 1/2002 |
| JP | 2002027417 | 1/2002 |
| JP | 2002502204 A | 1/2002 |
| JP | 2002064785 A | 2/2002 |
| JP | 2002505458 T | 2/2002 |
| JP | 2002506296 | 2/2002 |
| JP | 2002084470 A | 3/2002 |
| JP | 2002152194 | 5/2002 |
| JP | 2002514024 | 5/2002 |
| JP | 2002175505 | 6/2002 |
| JP | 2002521879 | 7/2002 |
| JP | 2002216040 | 8/2002 |
| JP | 2002217894 | 8/2002 |
| JP | 2002232418 A | 8/2002 |
| JP | 2002232962 | 8/2002 |
| JP | 2002300152 | 10/2002 |
| JP | 2002319936 | 10/2002 |
| JP | 2002541685 | 12/2002 |
| JP | 2003503896 | 1/2003 |
| JP | 200352029 | 2/2003 |
| JP | 2003099327 A | 4/2003 |
| JP | 2003115832 | 4/2003 |
| JP | 2003124927 | 4/2003 |
| JP | 2003521843 T | 7/2003 |
| JP | 2003259284 A | 9/2003 |
| JP | 2003297015 A | 10/2003 |
| JP | 2003529963 | 10/2003 |
| JP | 2003339000 A | 11/2003 |
| JP | 2004048718 A | 2/2004 |
| JP | 200480663 | 3/2004 |
| JP | 2004507175 A | 3/2004 |
| JP | 2004532554 | 10/2004 |
| JP | 2004533174 | 10/2004 |
| JP | 2004343764 | 12/2004 |
| JP | 2005509367 | 4/2005 |
| JP | 2005512471 | 4/2005 |
| JP | 2005507572 | 5/2005 |
| JP | 2006518975 A | 8/2006 |
| KE | 2000165258 A | 6/2000 |
| KR | 20000062153 | 10/2000 |
| KR | 200130725 | 4/2001 |
| KR | 20010030696 | 4/2001 |
| RU | 2073913 C1 | 2/1997 |
| RU | 2077113 C1 | 4/1997 |
| RU | 2091983 C1 | 9/1997 |
| RU | 2115249 C1 | 7/1998 |
| RU | 2147792 C1 | 4/2000 |
| RU | 2187205 C2 | 8/2002 |
| TW | 353841 | 3/1999 |
| TW | 373372 | 11/1999 |
| TW | 388158 | 4/2000 |
| TW | 420910 B | 2/2001 |
| TW | 448658 | 8/2001 |
| TW | 502190 | 9/2002 |
| TW | 508958 B | 11/2002 |
| WO | 8301881 A1 | 5/1983 |
| WO | WO8608335 A1 | 12/1986 |
| WO | WO9611538 A2 | 4/1996 |
| WO | WO9715161 A1 | 4/1997 |
| WO | WO-9716924 A1 | 5/1997 |
| WO | WO9717790 A1 | 5/1997 |
| WO | WO9747094 | 12/1997 |
| WO | WO9748212 A1 | 12/1997 |
| WO | WO9810604 A1 | 3/1998 |
| WO | WO9825422 | 6/1998 |
| WO | WO9857509 A2 | 12/1998 |
| WO | WO9904583 A1 | 1/1999 |
| WO | WO9922466 A1 | 5/1999 |
| WO | WO9922478 A1 | 5/1999 |
| WO | WO9930234 A1 | 6/1999 |
| WO | WO9939524 | 8/1999 |
| WO | WO9717790 A2 | 9/1999 |
| WO | WO9944114 A1 | 9/1999 |
| WO | WO9949588 | 9/1999 |
| WO | WO9949595 A1 | 9/1999 |
| WO | WO9959355 A2 | 11/1999 |
| WO | WO9962231 A1 | 12/1999 |
| WO | WO9966657 A1 | 12/1999 |
| WO | WO0002406 A2 | 1/2000 |
| WO | WO0004718 A1 | 1/2000 |
| WO | WO0000883 A1 | 2/2000 |
| WO | WO0013356 A1 | 3/2000 |
| WO | WO0033535 A1 | 6/2000 |
| WO | WO0036804 A1 | 6/2000 |
| WO | WO0048358 | 8/2000 |
| WO | WO0051308 A2 | 8/2000 |
| WO | WO0052880 A2 | 9/2000 |
| WO | WO0056018 A1 | 9/2000 |
| WO | WO0057601 A1 | 9/2000 |
| WO | WO0062476 | 10/2000 |
| WO | WO0062547 A1 | 10/2000 |
| WO | WO0072609 | 11/2000 |
| WO | WO0074311 | 12/2000 |
| WO | WO0074425 A1 | 12/2000 |
| WO | WO0076125 A1 | 12/2000 |
| WO | WO0076234 A1 | 12/2000 |
| WO | WO0078008 A1 | 12/2000 |
| WO | WO0079734 | 12/2000 |
| WO | WO0101630 A1 | 1/2001 |
| WO | WO0110146 | 2/2001 |
| WO | WO0113358 | 2/2001 |
| WO | WO0117163 | 3/2001 |
| WO | WO0119027 A2 | 3/2001 |
| WO | WO0120805 | 3/2001 |
| WO | WO0145443 | 6/2001 |
| WO | WO0150783 | 7/2001 |
| WO | WO0156232 | 8/2001 |
| WO | WO0208449 | 1/2002 |
| WO | 0215578 A1 | 2/2002 |
| WO | WO0247356 | 6/2002 |
| WO | WO0247407 A2 | 6/2002 |
| WO | WO02054663 A2 | 7/2002 |
| WO | WO02061572 A1 | 8/2002 |
| WO | WO02080449 A1 | 10/2002 |
| WO | WO02080454 A2 | 10/2002 |
| WO | WO02096150 | 11/2002 |
| WO | WO03001772 | 3/2003 |
| WO | WO03032573 A2 | 4/2003 |
| WO | 03043310 A1 | 5/2003 |
| WO | 03051056 A1 | 6/2003 |
| WO | WO03051072 | 6/2003 |
| WO | WO03063418 A1 | 7/2003 |
| WO | WO2004025895 A1 | 3/2004 |
| WO | WO2005008393 | 1/2005 |
| WO | WO2009130589 A1 | 10/2009 |

OTHER PUBLICATIONS

Baugher, McGrew, Carrara, Naslund, Norrman: "The Secure Real-Time Transport Protocol (draft 09)" Internet Engineering Task Force, AVT Working Group, Internet-Draft, Jul. 2003, XP002320685.
Meier J D; Mackman A; Dunner M; Vasireddy S: "Building Secure ASP.NET Applications: Authentication, Authorization, and Secure

(56) References Cited

OTHER PUBLICATIONS

Communication: Cryptography and Certificates" Microsoft Patterns & Practices, Nov. 2002, pp. 1-5, XP002321827.
Patent Abstracts of Japan vol. 2003, No. 08, JP 2003 124927, Apr. 25, 2003.
International Search Report—PCT/US2004/028677, International Search Authority—European Patent Office, Apr. 6, 2005.
Written Opinion—PCT/US2004/028677, International Search Authority—European Patent Office, Apr. 6, 2005.
International Preliminary Report on Patentability—PCT/US2004/028677, International Search Authority—IPEA/US, Aug. 29, 2006.
Alfred J. Menezes, Paul C. van Oorschot and Scott A. Vanstone, Handbook of Applied Cryptography, CRC Press. (Oct. 1996): p. 364 (in particular, refer to section 9.6.3), http://www.cacr.math.uwaterloo.ca/hac/about/chap9.pdf.
European Search Report—EP10005810, Search Authority—Munich Patent Office, Nov. 10, 2010.
Haverinen H: "EAP SIM Authentication", 3GPP Draft: S3-010663_Draft-Haverinen-PPPEXT-EAP-SIM-0 2, 3rd Generation Partnership-Project (3GPP), Mobile Competence Centre; 650, Route des Lucioles; F-06921 Sophia-Antipolis Cedex; France, vol. SA WG3, No. Sophia; Nov. 28, 2001, XP050271835, [retrieved on Nov. 28, 2001].
Translation of Office Action in Japanese application 2002-577339 corresponding to U.S. Appl. No. 09/933,971, citing JP11331070, JP2090840, JP2000244603 and JP2000115860 dated Oct. 19, 2010.
3GPP TS 25.211 V4.2.0, 3rd Generation Partnership Project; Technical Specification Group Radio Access Network; Physical Channels and Mapping of Transport Channels onto Physical Channels (FDD)(Release 4)(Sep. 2001).
3GPP TS 25.212 V4.2.0, 3rd Generation Partnership Project; Technical Specification Group Radio Access Network; Multiplexing and Channel Coding (FDD)(Release 4)(Sep. 2001).
3GPP TS 25.214 v4.1.0 (Jun. 2001) Universal Mobile Telecommunications System (UMTS); Physical layer procedures (FDD), Release 4, ETSI TS 125 214 V4.1.0, Jun. 2001.
3GPP TS 25.214 V4.2.0 (Sep. 2001) 3rd Generation Partnership Project; Technical Specification Group Radio Access Network; Physical Layer Procedures (FDD)(Release 4).
3GPP2 C.S0002-0 Version 1.0 (Jul. 1999) 3rd Generation Partnership Project 2 "3GPP2" Physical Layer Standard for cdma2000 Spread Spectrum Systems.
Al-Tawil, "A New Authentication Protocol for Roaming Users in GSM", Proceedings for IEEE international Symposium on Computers and Communication, Jul. 6, 1999, pp. 93-99.
Asaka et al., "Dynamic Multicast Routing Using Predetermined Path Search". Technical Report of IEICE (The Institute of Electronics, Information and Communication Engineers), SSE95-56 IN99-37 CS99-78, Sep. 27, 1999.
Baccelli, F. et al: "Self Organizing Hierarchical Multicast Trees and Their Optimization," INFOCOM 1999. IEEE, 1081-1089 (Mar. 21, 1999).
Berkovits, S. "How to Broadcast a Secret" Advances in Cryptology, Eurocrypt, International Conference on the Theory and Application of Cryptographic Techniques, Springer-Verlag, Delaware, Apr. 11, 1991, pp. 535-541.
Bormann, C., et al. "Robust Header Compression (ROHC)" Internet Draft, Dec. 2000, pp. 1-122, XP002901751 (pp. 4-5).
Brown: "The Electronic Post It Note Model for Mobile Computing Applications," Computing Lab, The University, Canterbury, Kent, The Institution of Electrical Engineers, IEEE, Savoy Place, London, WC2R OBL, UK, 1995.
Estrin, et al., "The Protocol Independent Multicast-Sparse Mode (PIM-SM)," RFC 2362, Jun. 1998.
ETSI TR 125 925 V3.3.0: "Universal Mobile Telecommunications System (UMTS); Radio Interface for Broadcast/Multicast Services (3GPP TR 25.925 version 3.3.0 Release 1999)," XP002230388, pp. 1-35, (Dec. 2000).
ETSI TS 125 213 v4.1.0: Universal Mobile Telecommunications System (UMTS); Spreading and modulation (FDD), 3G TS 25 213 version 4.1.0 Release 4 (Jun. 2001).
ETSI: "Universal Mobile Telecommunications Systems (UMTS); Multimedia Broadcast/Multicast Service (MBMS); Stage 1, 3GPP TS 22.146 version 5.2.0 Release 5", ETSI TS 122 146 v5.2.0, pp. 1-15, Mar. 2002.
Farinacci, D., et al., "Generic Routing Encapsulation (GRE)," Network Working Group Request for Comments 2784, 1-8, Mar. 2000. URL:http://www.globecom.net/ieft/rfc/rfc2784.html (retrieved on Feb. 14, 2003).
FOLDOC, Spread-spectrum communications, definition, dated Aug. 8, 2001, from http://foldocorg/indexcgi?query=spread+spectrum.
"Functional Model of a Conditional Access System", EBU Review—Technical European Broadcasting Union, Bussels, BE, No. 266; Dec. 21, 1995; pp. 64-77; XP000559450.
Gong, L. et al: "Trade-Offs in Routing Private Multicast Traffic," Global Telecommunications Conference, 1995. IEEE, 2124-2128 (Nov. 13, 1995).
Handley, M. et al., "SDP: Session Description Protocol" Network Working Group, Request for Comments: 2327, Category: Standards Track. ISI/LBNL, Apr. 1998. pp. 1-42.
Haverinen, et al., "EAP SIM Authentication" draft-haver inen-pppext-eap-sim-11 .txt, [online] <URL:http:l/www.watersprings.orglpub/id/draft-haverinen-pppext-eap-sim- 11 .txt> Jun. 2003, pp. 1-64.
IEEE. "IEEE Std. 802.11, Part 11; Wireless LAN Medium Access Control (MAC) and Physical Layer (PHY) Specifications" 1997, pp. 60-70.
Jalali, A., et al. "Data Throughput of CDMA-HDR a High Efficiency-High Data Rate 408 Personal Communication Wireless System," IEEE VTC2000, QUALCOM inc., San Diego CA 2000 pp. 1854-1858.
JNSA, "Trend of the Latest Security Protocol IPsecH—with Demonstration Experiment 409 Report for Interconnection," Network Magazine, vol. 6, No. 6, Japan, Jun. 2001, vol. 6, pp. 86-93.
Jou, Y.: "Developments in Third Generation (3G) CDMA Technology" Spread Spectrum Techniques and Applications, 2000 IEEE Sixth International Symposium on Sep. 6-8, 2000, Piscataway, Nj, USA, IEEE vol. 1, Sep. 6, 2000, pp. 460-464.
Kalliokulju J.: "User Plane Architecture of 3rd Generation Mobile Telecommunication Network," IEEE International Conference on Networks, ICON, Proceedings on Networks (ICON'99), Sep. 28, 1999-Oct. 1, 1999, pp. 270-278, XP010354980.
Keeler, Robert E., "Interoperability Considerations for Digital HDTV," IEEE Transactions on Broadcasting, vol. 37, No. 4, Dec. 1991, pp. 128-130.
Lin, et al: "A Multicast Routing Protocol for Multihop Wireless Networks," Dept. of Computer Science and Information Engineering, Chung Cheng University, Taiwan, Global Telecommunications Conference, Globecam 99, pp. 235-239, XP010373304.
Linuxguruz,: "Free On-Line Dictionary of Computing", Internet Protocol, Dec. 2000.
Lou H., et al., "Progressive Video Streaming Over 2G and 3G Wireless Systems, XP010520891," Proceedings of the 11th IEEE International Symposium on Personal Indoor and Mobile Radio Communications, 2000, 2 (18-21), 1550-1554.
Macq. Benoit M. et al, "Cryptology for Digital TV Broadcasting", 1995 IEEE, vol. 83, Issue 6, pp. 944-957.
Marchent, B.G., et al. "Intelligent Control of Mobile Multimedia Systems" Vehicular Technology Conference 1998. VTC 98, 48th IEEE Ottawa, Canada, May 18-21, 1998; New York, USA, May 18, 1998, pp. 2047-2051.
Menezes, A. et al.: "Handbook of Applied Cryptography" 1997, CRC Press LIC, USA XP002248262 pp. 497-500, 551-553.
Menezes, A. et al.: "Handbook of Applied Cryptography," Chapter 13, pp. 543-590, CRC Press (1996).
Menezes et al.: "Key Layering and Cryptoperiods," Passage, Handbook of Applied Cryptography, CRC Press Series on Discrete Mathematics and its Applications, Boca Raton, FL, CRC Press, US, 1997, pp. 551-553, 577-581.
Mooij, W.: "Advances in Conditional Access Technology", IEEE, pp. 461-464 (Sep. 1997).

(56) References Cited

OTHER PUBLICATIONS

Moy, "Multicast Extensions to OSPF," RFC 1584, Mar. 1994.
Okamoto "Encryption Technology for Realizing a Bright Information Society 5: Management of Encryption Key Distribution", Bit, Japan. Kyoritsu Shuppan Co., Ltd, Nov. 1, 1991, vol. 23, No. 12, pp. 51-59.
Osamu Takahashi "Prospect of Push type Information Delivering Service/Technology", Translation of Cited Reference 4, pp. 1-19, Nov. 1998.
Paul K et al: "A Stability-Based Distributed Routing Mechanism to Support Unicast and Multicast Routing in Ad Hoc Wireless Network" Computer Communcations, Elsevier Science Publishers BV, Amsterdam, NL, vol. 24, No. 18, Dec. 1, 2001, pp. 1828-1845, XP0043.
Pelletier, et al., "Robust Header Compression (ROHC): A Profile for TCP/IP (ROHC-TCP)" Internet Draft, Feb. 21, 2005, pp. 1-2.
Schneier, B.: "Applied Cryptography, Conference Key Distribution and Secret Broadcasting" Second Edition, pp. 520, 523-524, John Wiley & Sons, Inc. XP002248263 (1996).
Schneier, B.: "Applied Cryptography," Second Edition, pp. 170, 171, 173, John Wiley & Sons, Inc. (1996).
Schneier, B.: "Applied Cryptography," Second Edition, pp. 182-184, John Wiley & Sons, Inc. (1996).
Shannon, C.E., "A Mathematical Theory of Communication," The Bell System Technical Journal, vol. 27, pp. 379-423, 623-656, July, Oct. 1948.
Simpson, W., "PPP in HDLC-Like Framing," Network Working Group, Request for Comments: 1662 (RFC 1662), Jul. 1994. pp. 1-34.
Stallings, W.: "Cryptography and network security" 1995, Prentice-Hall, Inc., XP002248261 pp. 402-406, 413-417, 421-424.
Stallings, W.: "Cryptography and network security: Principles and Practice" Second Edition, 1999, Prentice Hall, New Jersey, pp. 400-413.
Tadaumi, "IP Technology as Communcation Infra," The Institute of Electronics Information and Communcaition Engineers, vol. 83, No. 4, Apr. 2000, pp. 286-294.
Tanenbaum, Andrew S.: Computer Networks, Third Editon; Pub. 1996; pp. 8, and 179-190.
Tanenbaum, Andrew S.: Computer Networks Second Edition: Pub 1993, pp. 16, 199-203, XP2530414.
TIA/EIA/IS-856 Interim Standard cdma2000 High Rate Packet Data Air interface Specification (Nov. 2000).
TIA/EIA/IS-95-A, Mobile Station-Base Station Compatibility Standard for Dual-Mode Wideband Spread Spectrum Cellular System (Revision of TIA/EIA/IS-95)(May 1995).
TIA/EIA/IS-95-B Mobile Station-Base Station Compatibility Standard for Dual-Mode Wideband Spread Spectrum Cellular System (IS-95 Standard), Feb. 3, 1999.
Toh C-K et al: "ABAM: On-Demand Associativity-Based Multicast Routing for Ad Hoc Mobile Networks," Vehicular Technology Conference, 2000, IEE, 987-993 (2000).
Toshiaki Miyazaki "A Stream-data Multicast Protocol Using IP Unicast Address" Technical Report of IEICE, IN2001-9, May 11, 2001.
Waitzman, et al., "The Distance Vector Multicast Routing Protocol (DVMRP)," RFC 1075, Nov. 1, 1998.
Yamaguchi, S., "Realization of Multimedia Communications", Unix Magazine, ASCII Corporation, Jun. 1, 1996. vol. 11, No. 6, pp. 45-53.

Yang et al: "An Efficient Multicast Delivery Scheme to Support Mobile IP," Database and Expert Systems Applications, 1999. IEEE, 638-88 (Sep. 1, 1999).
You Xiaohu, "R&D Progress on China's 3G Mobile Communications", Telecom Science, vol. 2, 2001, p. 11-17.
Brown, D., "Techniques for Privacy and Authentication in Personal Communication Systems," IEEE Personal Communications, vol. 2, No. 4, pp. 6-10, Aug. 1995, doi: 10.1109/98.403452.
Taiwan Search Report—TW093120523—TIPO—Jun. 14, 2011.
Bauer D., et al., "An error-control scheme for a multicast protocol based on round trip time calculations", Local Computer Networks, 1996., Proceedings 21st IEEE Conference on Minneapolis, MN, USA Oct. 13-16, 1996, Los Alamitos, CA, USA, IEEE Comput. Soc, US, Oct. 13, 1996, pp. 212-221, XP010200690, DOI: 10.1109/LCN. 1996.558149 ISBN: 978-0-8186-7617-8 * chapters 3+3.1 *.
Mysore J. P., et al., Performance of transport protocols over a multicasting-based architecture for Internet host mobility, Communications, 1998. ICC 98. Conference Record. 1998 IEEE International Conference on Atlanta, GA, USA Jun. 7-11, 1998, New York, NY, USA, IEEE, US, vol. 3, Jun. 7, 1998, pp. 1817-1823, XP 010284635, DOI: 10.1109/ICC. 1998.683142 ISBN: 978-0-7803-4788-5 * abstract * * chapter 2 *.
Yajnik M., et al., "Packet loss correlation in the MBone multicast network", Global Telecommunications Conference, 1996. Globecom '96. Communications: The Key to Global Prosperity London, UK Nov. 18-22, 1996, New York, NY, USA, IEEE, US, Nov. 18, 1996, pp. 94-99, XP010220159, DOI: 10.1109/GLOCOM. 1996. 586133 ISBN: 978-0-7803-3336-9 * chapter 3.1 *.
"Feature Story I: Evolution of Cellular Phones," ASCII, Dec. 1, 2000, vol. 24, No. 12, p. 204.
R. Sinnarajah, Signaling Support for Broadcast Service, 3GPP2 TSG-C Contribution, 2002, C20-20020107-022, URL http://ftp.3gpp2.org /TSGC/Working/2002/TSG-C-0201/TSG-C-0201-Vancouver/WG2/C20-20020107-020 (Signaling-Support-for-Broadcast-Service).doc.
Qualcomm Europe: "MBMS Security Framework", 3GPP TSG SA WG3 Security—S3 #29 S3-030356, Jul. 2003, MBMS Security and 3GPP-3GPP2 joint meeting, whole document.
Romkey J., "A Nonstandard for Transmission of IP Datagrams Over Serial Lines: SLIP", rfc1055, IETF, Jun. 1988, URL, http://www.ietf.org/rfc/rfc1055.txt, whole document.
3GPP2 C.R1001-A, "Administration of Parameter Value Assignments for cdma2000 Spread Spectrum Standards Release C" Jul. 14, 2000, Version 2.0.
Chen T., et al., "cdma2000 Broadcast Services Stage 2: System Design", C10-20010820-008, 3GPP2, Aug. 20, 2001.
Menezes Alfred J., et al., "Handbook of Applied Cryptography," 1997 CRC Press, pp. 169-190.
Ohnishi H., et al., "Proposed Scheme for Route Optimization on the Mobile IP Network." Technical Report of the Institute of Electronics, Information and Communication Engineers, SSE99-123 PS99-47, Dec. 17, 1999.
Taiwan Search Report—TW093120386—TIPO—Feb. 8, 2012.
Momona, M., et al., "Technologies and Standardization Activities in Cable TV Access Networks," IEICE Technical Report, Japan. The Institute of Electronics, Information and Communication Engineers (IEICE), Feb. 15, 1999. vol. 98, No. 589: pp. 57-64.
Haverinen, R., "GSM SIM Authentication and Key Generation for Mobile IP"; draft-haverinen-mobileip-gsmsim-01.txt; Internet Engineering Task Force, IETF, CH; Nov. 2000; XP015014135.

* cited by examiner

METHOD AND APPARATUS FOR PROVIDING AUTHENTICATED CHALLENGES FOR BROADCAST-MULTICAST COMMUNICATIONS IN A COMMUNICATION SYSTEM

CLAIM OF PRIORITY UNDER 35 U.S.C. §119

The present Application for Patent claims priority to U.S. Provisional Application No. 60/499,563, filed Sep. 2, 2003, assigned to the assignee hereof and hereby expressly incorporated by reference herein, and to U.S. Provisional Application No. 60/502,866, filed Sep. 11, 2003, assigned to the assignee hereof and hereby expressly incorporated by reference herein.

BACKGROUND

1. Field

The present invention relates generally to communications, and, more specifically, to a method and apparatus for providing authenticated challenges for broadcast-multicast services (BCMCS) in a wireless communication system.

2. Description

In a wireless communication system that carries non-voice traffic, such as video, data, multimedia, or other types of traffic in addition to voice traffic, a typical cellular base station may broadcast a multimedia traffic service to a plurality of mobile stations within the coverage area of the base station. The multimedia traffic service may include any number of information services similar to a number of channels included in a cable television service plan, for example. These information services typically rely upon security to maintain accountability, fairness, accuracy, confidentiality, and operability. Encryption, or the general field of cryptography, is used in electronic commerce, wireless communications, and broadcasting. In electronic commerce, encryption is used to prevent fraud and verify financial transactions. In data processing systems, encryption is used to verify a participant's identity. In broadcast-multicast service, security is maintained based on the broadcast-multicast service (BCMCS) key hierarchy. Content is encrypted with a short term key (SK) and is sent over the air. A long-term encryption key, often referred to as a broadcast access key (BAK), is provisioned into a memory module referred to as a user identification module (UIM) or universal integrated circuit card (UICC) of the mobile station. The user may be charged for the long-term encryption key BAK. The short-term key SK is derived from the BAK and a random number referred to as SKRAND. The UIM uses the BAK and the SKRAND to compute the short-term key SK. Once the UIM computes the SK, it is sent to the mobile station and the mobile station uses the SK to decrypt and view the information content. Typically, information content charging based on this method charges the user upon receipt of the BAK. Thus, the user is charged whether or not the user actually views the broadcast content. Unlike cable television, in a wireless communication system, it is desired that the actual view time of information services by a user be maintained. This is to ensure accurate billing for the content viewed and to ensure that unauthorized users, such as under-age users, for example, cannot access certain types of content. Methods that require the mobile station to register periodically or on demand have been proposed to maintain a record of actual view time by the user.

The registration message contains a list of channels the user is watching or is capable of watching. The list is used to charge the user for information services.

Typically, the methods requiring the user to register periodically or on demand are prone to theft-of-service because the mobile station may continue to receive the broadcast content without registering again in the system, thus obtaining free access to the content. In addition, an unauthorized user, such as an under-age user, for example, may access content that is prohibited by regulatory statute. Other proposed methods introduce additional encryption keys necessary to view the content of the information services. These methods suffer from a severe decrease in data-carrying capacity of the wireless system caused by the increase in overhead messages required for encryption key management.

The present invention is directed to overcoming, or at least reducing the effects of, one or more problems provided above.

SUMMARY

According to one aspect, in a wireless communication system providing authenticated challenges for broadcast-multicast services, a method for receiving a first value and a first message authentication code, generating a second message authentication code of the first value by running a hashing function on the first value using a second value wherein the second value is stored in a memory module as a second key, comparing the second message authentication code with the first message authentication code, and computing the short-term key using the first value and the second value when the second message authentication code is equal to the first message authentication code.

In another aspect, a method of obtaining an encryption key in a communication system using a first protocol, the method comprising: receiving a packet index value and a first message authentication code, generating a second message authentication code of the packet index value by running a hashing function on the packet index value using a second value wherein the second value is stored in a memory module, comparing the second message authentication code with the first message authentication code, and computing an encryption key using the packet index value and the second value when the second message authentication code is equal to the first message authentication code.

In another aspect, a mobile station apparatus for obtaining a short-term key comprising: a means for receiving a first value and a first message authentication code, a means for generating a second message authentication code of the first value by running a hashing function on the first value using a second value wherein the second value is stored in a memory module, a means for comparing the second message authentication code with the first message authentication code, and a means for computing a short-term key using the first value and the second value when the second message authentication code is equal to the first message authentication code.

In another aspect, A mobile station apparatus for of obtaining an encryption key using a first protocol, comprising: a means for receiving a packet index value and a first message authentication code a means for generating a second message authentication code of the packet index value by running a hashing function on the packet index value using a second value wherein the second value is stored in a memory module as, a means for comparing the second message authentication code with the first message authentication code, and a means for computing an encryption key using the packet index value

DETAILED DESCRIPTION

Figure 1:
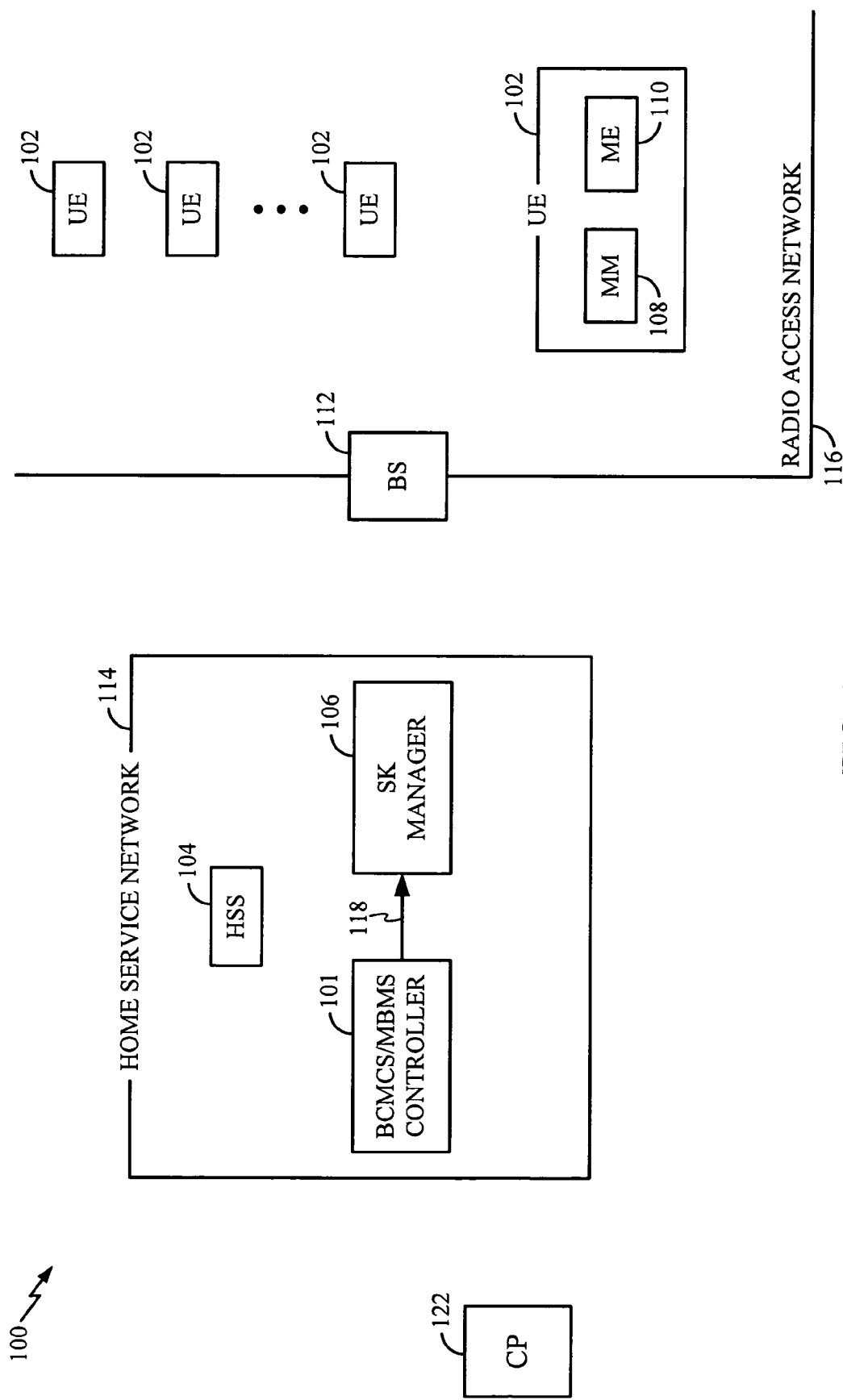
FIG. 1 is an exemplary block diagram illustrating a wireless communication system providing a broadcast-multicast communication service (BCMCS) according to one embodiment.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

A mobile station, also referred to as a user equipment (UE), may communicate with one or more base stations. A mobile station transmits and receives data packets through one or more base stations to a base station controller or, as described herein, a broadcast-multicast service (BCMCS) controller (also referred to as a multicast-broadcast-multimedia system (MBMS) controller in 3GPP). Base stations and base station controllers are parts of a network called an access network (AN). Base stations and mobile stations are parts of a network called a radio access network (RAN). The radio access network transports data packets between multiple mobile stations. The radio access network may further be connected to additional networks, such as an Authentication, Authorization, and Accounting (AAA) server or the Internet, for example, and may transport data packets between each mobile station and such outside networks through the base station controller or a BCMCS controller.

The BCMCS controller transports data through a short-term key manager (SK-manager). The SK-manager determines seed values, which may be a random number, a sequence number, time stamp, or other changing value that is convenient for implementation. Once the SK-manager determines a seed value (SKSeed), it appends a message authentication code (MAC) to the seed value. The message authentication code (MAC) is a digital identifier and works like a digital signature to validate the source of the seed value. The MAC may be created by using a well known hashing function, such as SHA-1 or MD-5, for example, or the MAC may be generated by a variation of well known hashing functions. The hashing function uses the broadcast access key (BAK) (or a derivative of BAK) as the key to compute the MAC from a seed value. Because only the broadcast network and the subscribers to the broadcast network have the broadcast access key (BAK), the BAK (or a derivative of BAK) is used as the shared secret between the network and the user.

The mobile station (user equipment (UE)) may be a mobile telephone that includes a mobile telephone handset (referred to as a mobile equipment (ME)), and a memory module, such as a physically secure integrated circuit card or smart card (referred to as a user identification module (UIM) or universal integrated circuit card (UICC)), which may be removable or permanently attached to the mobile equipment ME. In a broadcast-multicast service (BCMCS), the memory module of the user equipment is provisioned with the broadcast access key (BAK).

FIG. 1 is an exemplary block diagram illustrating a wireless communication system 100 for providing authenticated challenges in a broadcast-multicast communication service (BCMCS) according to one embodiment of the present invention. The wireless communication system 100 comprises a plurality of user equipments (UE) 102 that communicate with at least one base station (BS) 112 over a wireless communication link. Communication from the user equipment 102 to the base station 112 is performed over a reverse link and communication from the base station 112 to the user equipment 102 is performed over a forward link over the wireless communication link. Although only one base station 112 is illustrated in the figure, this is merely for simplicity sake in illustrating the present invention. Accordingly, the wireless communication system 100 may include several base stations 112 that are geographically dispersed to provide continuous communication coverage with the user equipments 102 as they traverse the wireless communication system 100. A radio access network 116, through the base station 112, transmits radio signals to and receives radio signals from the user equipment 102 over the wireless communication link. The radio access network 116 may either be owned by the wireless carrier that provides subscription service to the user equipment 102, or may be a visited network owned by another carrier that provides service to the user equipment 102 while the user equipment 102 is roaming.

The user equipment 102 may take the form of any device that is capable of receiving information from the base station 102, including a personal digital assistant (PDA), wireless telephone, laptop computer with wireless capability, wireless modem, or any other wireless-capable device. The user equipment 102 includes mobile equipment (ME) 110, which provides communication with the base station 112 over the wireless communication link among various other functions. The user equipment 102 further includes a memory module (MM) 108 (referred to as a user identification module (UIM) or Universal Integrated Circuit Card (UICC)). The MM 108 may be either a removable memory module attached to the mobile equipment 110 or a permanent part of the mobile equipment 110. The functionality of the memory module 108 will be further appreciated as the detailed description proceeds.

According to one embodiment, the wireless communication system 100 employs a Broadcast-Multicast Service (BCMCS) for point-to-multipoint transmission of data packets to a predetermined group of user equipment 102 communicating within the wireless communication system 100. In one embodiment, the data packets provide content such as, for example, news, movies, sporting events, and the like that is transmitted from the base station 112 over the wireless communication link to the user equipment 102. It will be appreciated that the specific type of content transmitted to the user equipment 102 may include a wide array of multi-media data (e.g., text, audio, picture, streaming video, etc.), and, thus, need not necessarily be limited by the aforementioned examples.

The wireless communication system 100 further comprises a home service network 114 that is owned by the wireless carrier that provides subscription service to a user of the user equipment 102, and may or may not be owned by the same carrier as that of the radio access network 116 (depending upon whether the user equipment 102 is roaming outside the service area of the carrier). The home service network 114 includes a broadcast-multicast-service (BCMCS) controller 101, a short-term key SK-manager 106, and a home subscriber server (HSS) 104. Communication link 118 provides a data path on which information-bearing signals are carried from the BCMCS controller 101 to the SK-manager 106. Communication link 120 provides a data path from the SK-manager 106 to the base station 112, which is then broadcast/multicast to the plurality of user equipments 102.

Content provider 122 provides the content that is broadcast/multicast to the user equipment 102. The content provider 122 may be a third-party content source that is owned by neither the home network carrier nor the serving network carrier. The home subscriber server 104 in the home service network 114 may include a database for holding mobile telephone subscription and collecting billing data for broadcast-multicast services. In the illustrated embodiment, the home service network 114 also includes the broadcast-multicast service (BCMCS) controller 101, which schedules broadcasting/multicasting of content from content provider 122 and performs at least some security functions for the broadcast-multicast service. The radio access network 116 transmits the content to a single user through a dedicated channel, multicasts the content to a plurality of users through dedicated channels if the number of users demanding the service does not justify broadcasting the service to all users in the coverage area, or broadcasts the content to all users in the coverage area if the number of users demanding the service exceeds a predetermined threshold.

Broadcast-multicast service (BCMCS) (or multicast-broadcast-multimedia system (MBMS)) content viewing is based on a key hierarchy. The BCMCS or MBMS may use the same key hierarchy, and the terms are used depending on the context in which they are used (e.g., MBMS is often used when referring to broadcast services in a 3GPP network). Content viewing may require monitoring for billing or for regulatory issues, such as "adult" services, for example, that require a content provider to ensure the viewer is allowed to view "adult" services. For example, a content viewer of "adult" services may be required to verify that they are of a minimum age, determined by a regulator, to view such content. A key is a value that works with a cryptographic algorithm to produce specific ciphertext. Keys are usually very large numbers and are measured in bits. To decrypt the broadcast content at a particular time, the ME 110 of the user equipment should know the current decryption key. To avoid unauthorized access or theft-of-service, the decryption key should be changed frequently, for example, once every minute. These decryption keys are referred to as short-term keys (SK), and are used to decrypt the broadcast content for a relatively short-amount of time so the SK may be assumed to have some amount of intrinsic monetary value for a user.

In one embodiment, the content of the multimedia event is encrypted and decrypted in the broadcast-multicast system through several levels of encryption and decryption to provide at least some level of assurance that unauthorized users will not be able to decrypt the data and watch the multimedia event. Communication link 118 is used by the BCMCS controller 101 to transport the broadcast access key BAK to the SK-manager 106. The SK-manager 106 determines a value, SKSeed, and appends a message authentication code (MAC), formed from SKSeed and the shared secret, BAK. SKSeed can be a random number, a sequence number, time stamp or other changing value. The challenge SKSeed||MAC is then transmitted to the user equipment 102 via the radio access network 116. The user equipment 102, upon receiving this challenge in the memory module 108, first computes XMAC from SKSeed and BAK. XMAC is the message authentication code of the seed value derived by running a hashing function, using BAK or a derivative of BAK as the key. The memory module 108 then compares XMAC with the received MAC. If the computed value of XMAC is the same value as the received MAC, then the memory module generates SK and transmits SK to the ME. Thus, if these functions are implemented in sufficiently secure hardware (such as a smart card, for example) protecting the BAK (or keys derived from the BAK) substantially prevent an unauthorized user to pre-compute the short-term SK even with the full knowledge of the stream of SKSeed.

Figure 2:
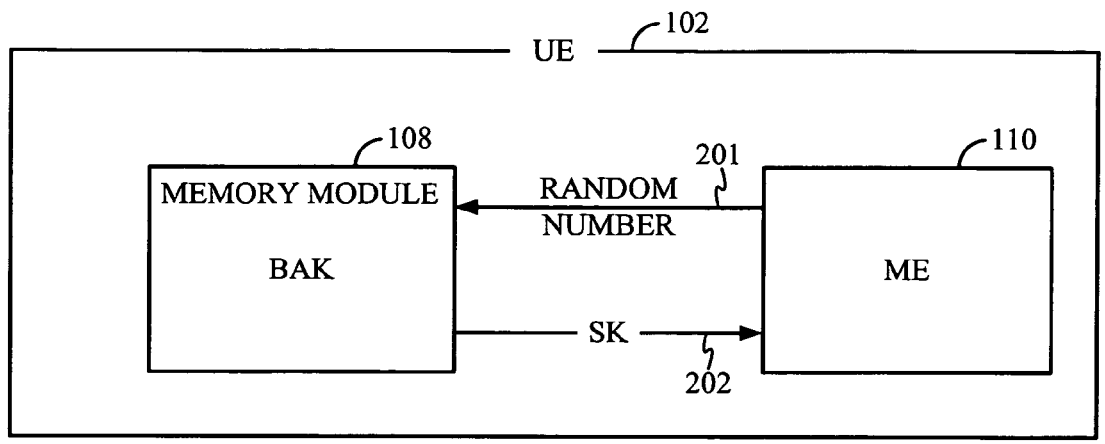
FIG. 2 is an exemplary block diagram for short-term key (SK) generation in a user equipment using a random number according to one embodiment.

FIG. 2 is an exemplary block diagram for short-term key SK generation at the user equipment 102 using a random number. A function, such as a hashing function, in the memory module 108 computes the short-term key SK with any random number input 201 from the ME 110. All broadcast subscribers have the broadcast access key BAK provisioned in the memory module 108. Since the short-term key SK 202 is a function of the random number 201 and the BAK, any random number input will generate the short-term key (SK) 202. Thus, in this scenario, a subscriber with the BAK provisioned in the memory module 108 may input any range of random numbers 201 to the memory module 108 and generate values of the short-term key SK 202. The subscriber may then publish or distribute these values of the short-term key SK 202, for example on the internet, and unauthorized users can use these SK values to view content.

Figure 3:
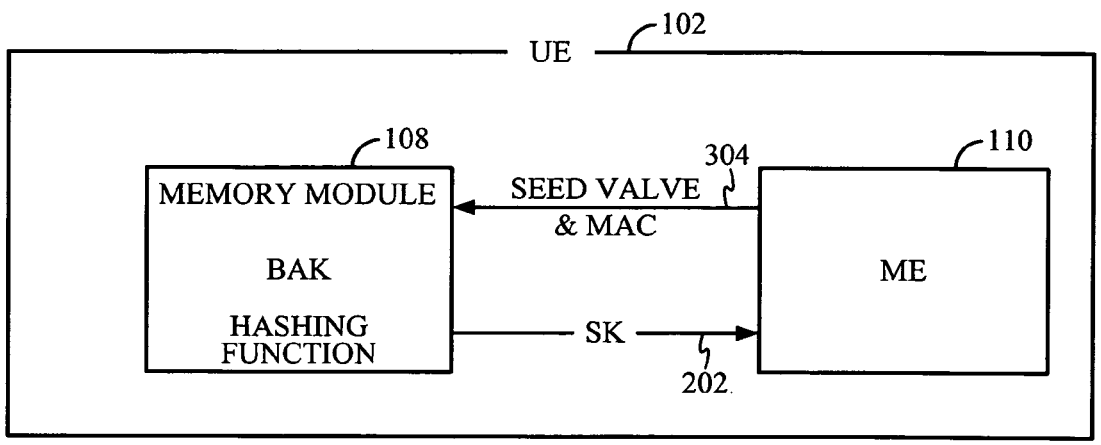
FIG. 3 is an exemplary block diagram for short-term key (SK) generation in a user equipment using a seed value (SKSeed) with a message authentication code appended thereto according to one embodiment.
Figure 4:
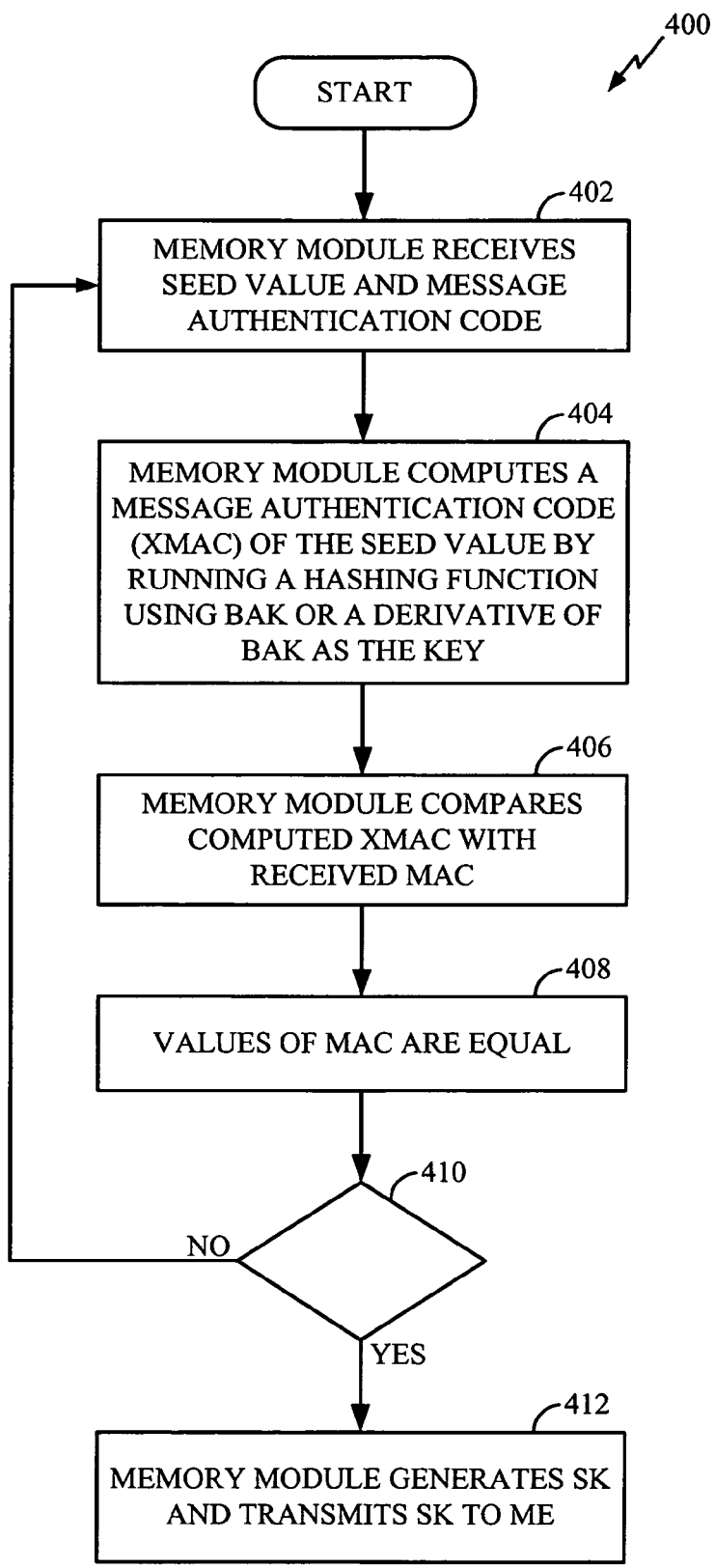
FIG. 4 is an exemplary flow diagram for short-term key (SK) generation using a seed value (SKSeed) with a message authentication code appended thereto according to one embodiment.

FIG. 3 is an exemplary block diagram for short-term key SK generation at the user equipment 102 using a seed value (SKSeed) with a Message Authentication Code (MAC) 304 appended thereto. The user equipment 102 of a BCMCS subscriber has a memory module 108 provisioned with the broadcast access key BAK. In this embodiment, memory module 108 also contains a hashing function. The hashing function can be a well know hashing function such as SHA-1 or MD-5 or a variation of a well known hashing function. The memory module 108 computes XMAC, the generated message authentication code, of the seed value SKSeed by running a hashing function using the BAK (or a derivative of BAK) as the key. The memory module 108 then compares the computed XMAC with the appended MAC. If XMAC and MAC are the same value, the memory module 108 generates a short-term (SK) 202 key, and transmits SK 202 to the mobile equipment (ME) 110. The ME 110 can now view content. In this scenario SK cannot be generated without validating the source of SK. Thus, this scenario prevents unauthorized users from viewing information content. Thus, unlike the method in FIG. 2, an unauthorized user cannot retrieve the value of SK because, SK can only be generated by validating the source of SK. A method for generating the short-term key SK in accordance with one embodiment for decrypting received content at a user equipment 102 is illustrated in FIG. 4. The short-term key SK generation process 400 commences at block 402 where the memory module 108 of the user equipment 102 receives a seed value SKSeed appended with a Message Authentication Code. At block 404 the memory module 108 computes a message authentication code (XMAC) of the seed value (SKSeed) by running a hashing function using the BAK (or a derivative of BAK) as the key. Keeping in mind that BAK is provisioned in the memory module (108), and the Seed value can be generated by the SK manager or the BCMCS controller. The hashing function resides in the memory module. At block 406, the memory module 108 compares the computed XMAC with the received MAC. The memory module 108 then determines if the values of XMAC and MAC are equal at block 408. If the values are equal, the memory module 108 knows the source of the seed value, SKSeed, is trusted because it has the shared secret BAK. Once the memory module 108 determines the source of SKSeed is trusted, it generates the short-term key SK and transmits the SK to the ME 110 at block 412. The ME 108 can now use the short-term key SK to decrypt the received content to allow successful viewing of the content by the user of the user equipment 102. If, however, the computed value of XMAC and the received value of MAC are not equal at block 408, the SKSeed is discarded and the process starts again at block 402.

Figure 5:
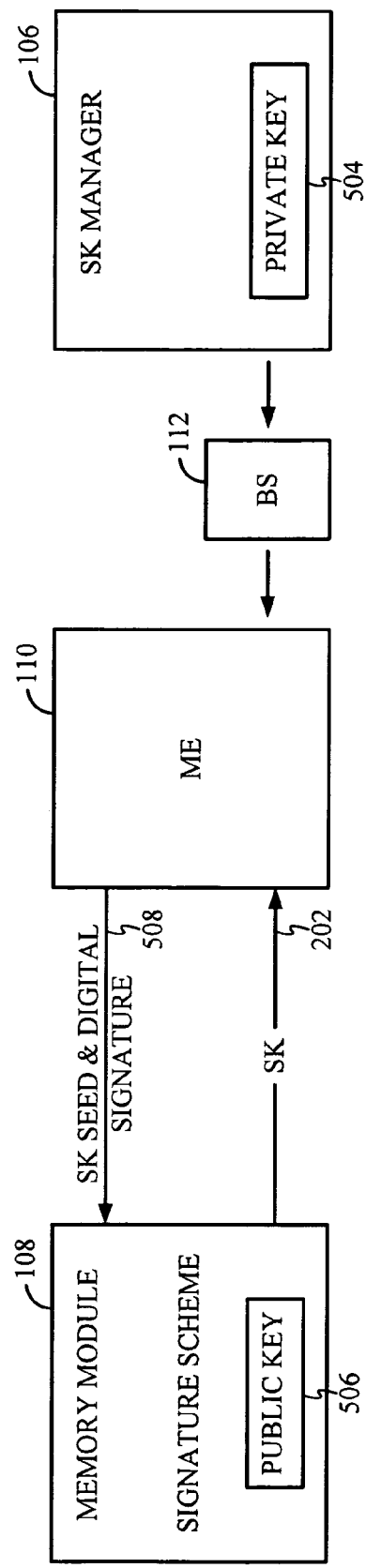
FIG. 5 is an exemplary block diagram for short-term key (SK) generation with an SK Manager having a private key for which a corresponding public key is distributed to the user equipment according to one embodiment.

In another embodiment, shown in FIG. 5, The SK manager 106 determines a seed value (SKSeed) and appends a digital signature that is verified by the memory module 108. In this particular embodiment, the SK manager 106 has a private key 504 and the memory module 108 has the corresponding public key 506. This public approach could make use of well known digital signatures such as Rivest-Shamir-Adleman (RSA), The Digital Signature Algorithm, DSA, Elliptic Curve DSA, or other well known signatures. The SK manager 106 determines a seed value (SKSeed) and appends a digital signature formed from the private key 504 in the SK manager 106. The challenge SKSeed||Digital signature is then transmitted to the memory module 108. The ME 110 receives this challenge through the base station 112 and passes the SKSeed and Digital signature 508 to the memory module 108 of the user equipment 102. The memory module 108 uses the public key, by using RSA, the Digital Signature Algorithm DSA, Elliptic Curve DSA or other well known or not known signature schemes to verify the signature transmitted from the SK manager through base station 112, through the ME 110 to the memory module 108. In the memory module 108, the public key 506 is used to verify the digital signature by using the public key 506 and the appended private key 504. If the memory module 108 determines the digital signature was created by the SK manager 106, the memory module 108 generates the short-term key SK 202 and transmits the SK 202 to the ME 110. Upon successfully generating the short-term key SK 202, the ME 110 permits the user to view the received information content. If the memory module 108 determines the digital signature may not have been created by the SK manager 106, the memory module 108 discards the signature and waits for the next digital signature, and the ME 110 cannot determine or publish the SK value corresponding to this SKSeed. This prevents pre-computation of SK and helps to protect information content from unauthorized access.

In another embodiment, the same method and apparatus is used as an enhancement in the Secure Real-time Transport Protocol (SRTP). Reference SRTP draft 09, which expires December 2003 describes this protocol. A Master Key (MK) is treated like the shared secret BAK. Each MK has an index similar to the index in the BAK. The index identifies a specific content. The MK resides in the memory module 108, and when used with the packet index generates a short-term key (SK). The packet index in the SRTP is typically a sequence number, and in this context may be considered like SKSeed, which is taken to be a random number, a sequence number, time stamp or other changing value. The MK and the packet index are used to generate a SRTP encryption key (EK). This encryption key, like SK, is used to view or access content. Thus, the packet index must be secure to prevent unauthorized access or theft of content. The packet index can be protected in the same manner as the seed value (SKSeed) with an appended Message Authentication Code (MAC) as is used to protect SK. By appending a Message Authentication Code (MAC) to the packet index, the memory module 108 will know whether or not the packet index came from the intended, trusted, source. The memory module 108 handles this process in the same manner used to generate SK. As well as generating encryption keys, SRTP specifies further keys may be generated from the master key MK in an analogous manner to perform other functions including message authentication, and the security enhancements to the encryption key, detailed above, apply equally to other keys so generated.

Figure 6:
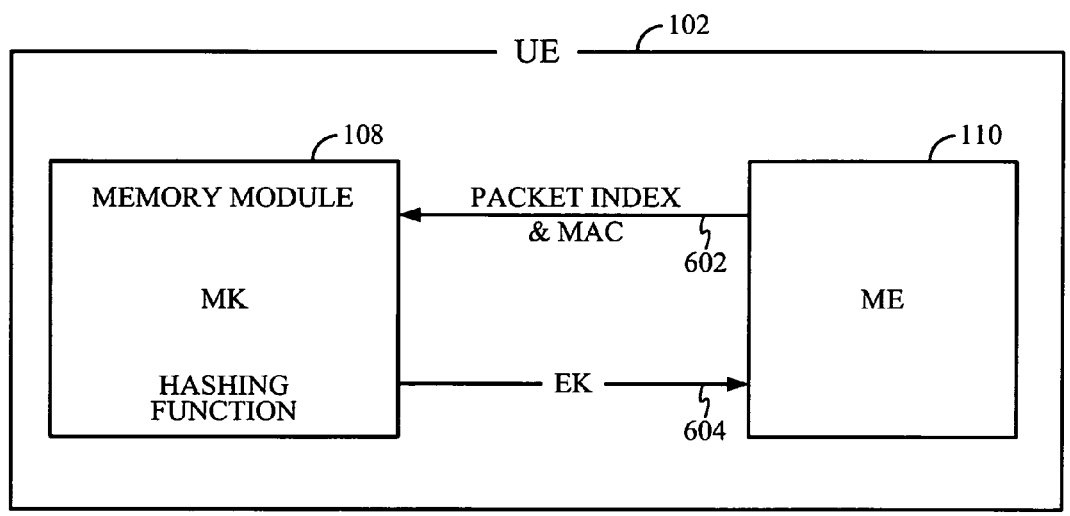
FIG. 6 is an exemplary block diagram for encryption key (EK) generation in a user equipment using a packet index seed value (PISeed) with a message authentication code appended thereto according to one embodiment.

FIG. 6 is an exemplary block diagram of Encryption Key (EK) generation using a packet index value (PI) with a Message Authentication Code (MAC) appended thereto 602. The User Equipment (UE) 102 of any broadcast subscriber has a memory module 108 provisioned with the MK. In this embodiment, memory module 108 also contains a hashing function. The hashing function can be a well know hashing function such as SHA-1 or MD-5 or a variation of a well known hashing function. The memory module 108 computes XMAC of the packet index value PI by running a hashing function using MK or a derivative of MK as the key. The memory module 108 then compares the computed XMAC with the appended MAC. If XMAC and MAC are the same value, the memory module 108 generates an encryption key (EK) 604 key and transmits EK 604 to the mobile equipment (ME) 110. The ME 110, upon successful generation of the EK 604, may now view the content by using EK 604 to decrypt the received encrypted content. In this scenario, EK 604 cannot be generated without validating the source of EK 604. Thus, this scenario prevents unauthorized users from viewing or accessing information content.

Figure 7:
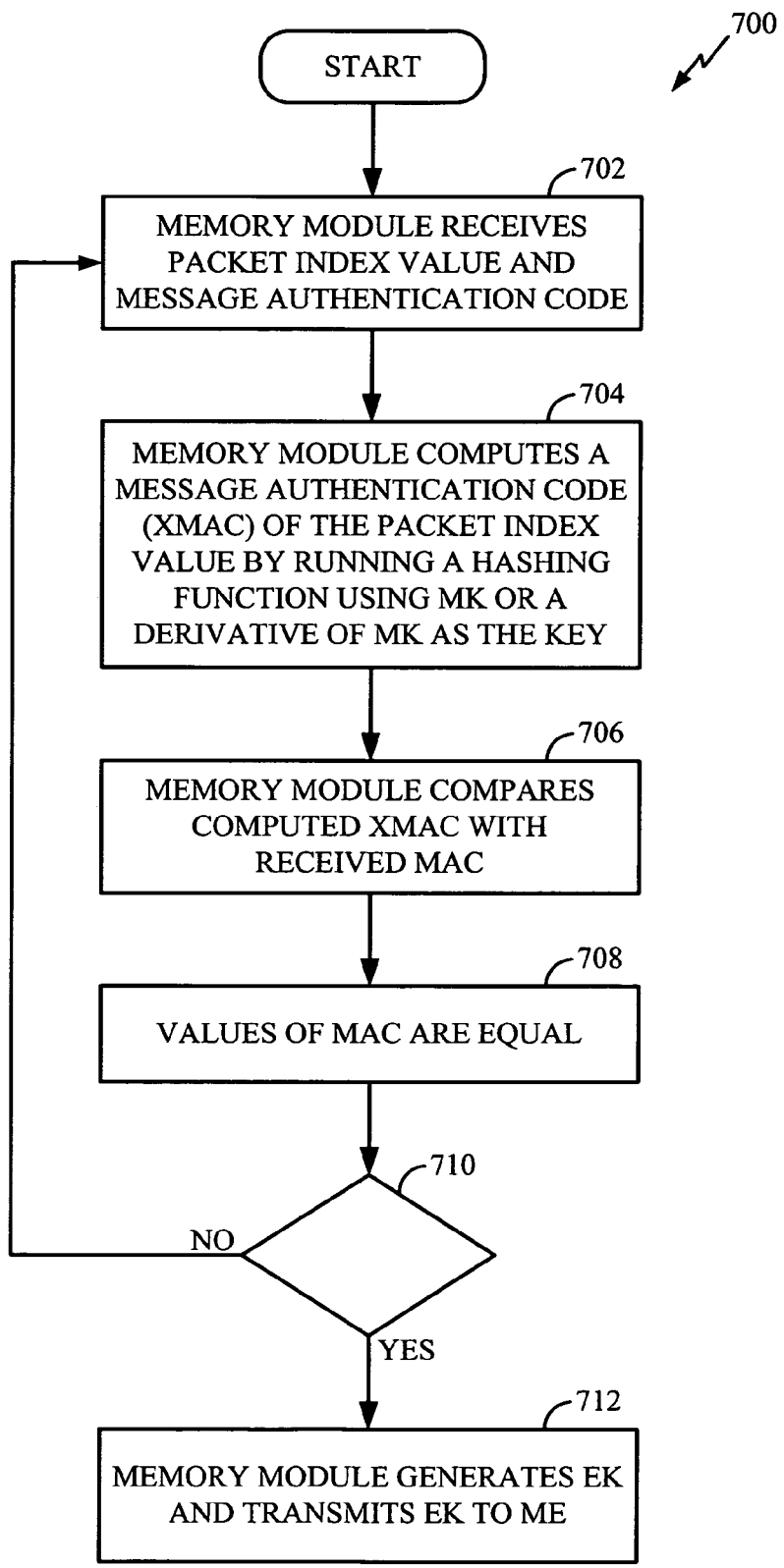
FIG. 7 is an exemplary flow diagram for encryption key (EK) generation using a packet index seed value (PISeed) with a message authentication code appended thereto according to one embodiment.

FIG. 7 illustrates the SRTP encryption key generation process 700 wherein the memory module 108 receives an packet index value PI appended with a Message Authentication Code at block 702. At block 704 the memory module 108 computes a message authentication code (XMAC) of the packet index value (PI) by running a hashing function using MK or a derivative of MK as the key. All broadcast subscribers have MK provisioned in the memory module 108. At block 706, the memory module 108 compares the computed XMAC with the received MAC. The memory module 108 determines if the values of XMAC and MAC are equal at block 708. If the values are equal, the memory module 108 knows the source of the packet index value (PI) is trusted because it has the shared secret MK. Once the memory module 108 determines the source of PI is trusted it generates an encryption key (EK) 604 and transmits the encryption key EK 604 to the ME 110 at block 712. The ME 110 can now view content upon successful generation of the EK 604. If XMAC and MAC are not equal at block 708, the PI is discarded and the process starts again at block 702.

Figure 8:
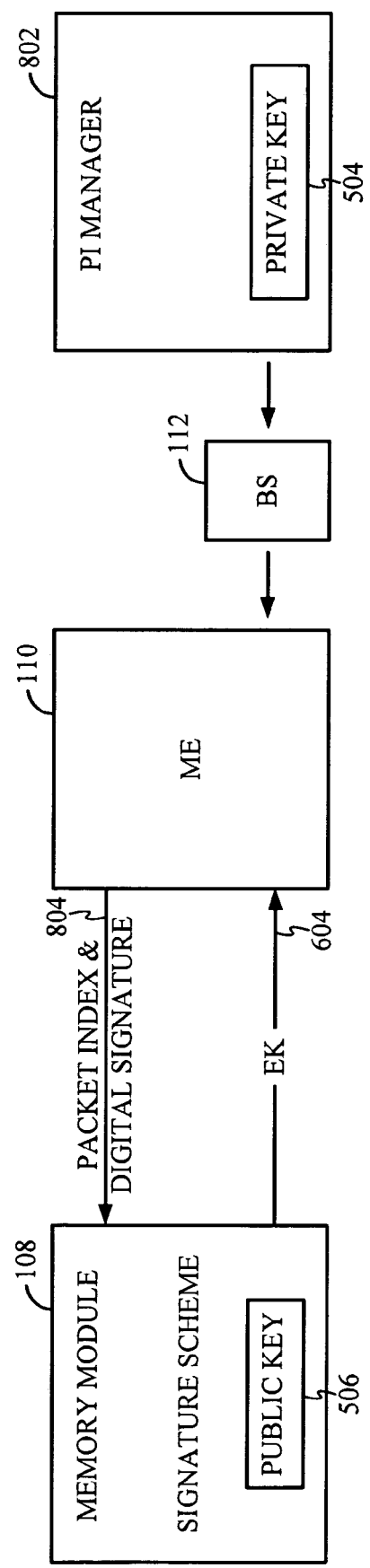
FIG. 8 is an exemplary block diagram for encryption key (EK) generation with a PI Manager having a private key for which a corresponding public key is distributed to the user equipment according to one embodiment.

In another embodiment, the packet index can be protected by using the packet index appended with a digital signature. In this embodiment, shown in FIG. 8, the Packet Index (PI) manager 802 determines a packet index value (PI) and appends a digital signature which will be verified by the memory module 108. In this embodiment, the PI manager 802 has a private key 504 and the memory module 108 has the corresponding public key 506. This public approach could make use of well known digital signatures such as Rivest-Shamir-Adleman (RSA), The Digital Signature Algorithm, DSA, Elliptic Curve DSA, or other well know signatures. The PI manager 802 determines a packet index value (PI) and appends a digital signature formed from the private key 504 in the PI manager 802. The challenge PI∥Digital signature is then transmitted. The ME 110 receives this challenge through the base station 112 and passes the PI and Digital Signature 804 to the memory module 108. The memory module 108 uses the public key, by using RSA, the Digital Signature Algorithm DSA, Elliptic Curve DSA or other well known or not known signature schemes to verify the signature transmitted from the PI manager 802 through the base station 112, through the ME 110 to the memory module 108. In the memory module 108, the public key 506 is used to verify the digital signature by using the public key 506 and the appended private key 504. If the memory module 108 determines the digital signature was created by the PI manager 802, the memory module 108 generates an Encryption Key (EK) 604 and transmits EK 604 to the ME 110. The ME 110 can now view information content upon successful generation of the EK 604. If the memory module 108 determines the digital signature may not have been created by the PI manager 802, the memory module 108 discards the signature and waits for the next digital signature, and the ME 110 cannot determine or publish the EK 604 value corresponding to this PI. This prevents pre-computation of the packet index and helps to protect information content from unauthorized access.

The embodiments related to SRTP also provide the additional security of protecting against the unauthorized generation of authentication and salting keys. This is similar to protecting against pre-computation of SK in a BCMCS/MBMS. Also, in SRTP, once the service provider deploys the same Master Key (MK) to the secure memory module 108 in a plurality of end-users, the end user can masquerade as the service provider. This is because any end user who has MK provisioned in the secure memory module 108 could use the secure memory module 108 to encrypt and add authentication to data. The embodiments described above prevent this scenario because the PI manager 802, by using a MAC or digital signature, ensures encryption key generation can only take place when the source of the packet index is verified as a trusted source.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of securely obtaining a short-term key for accessing content using a mobile station in a communication system for point-to-multipoint transmission of content to mobile stations, the method comprising:

receiving a first value and a first digital signature from a short-term key manager of the communication system for point-to-multipoint transmission of content to mobile stations, wherein the first digital signature is formed from a private key;

verifying the first digital signature using a signature scheme based on the private key and a public key, wherein the public key is stored in a first secure memory of a receiving mobile station and the signature scheme is stored in the first secure memory, and wherein the public key stored in the secure memory is not accessible to a mobile equipment of the receiving mobile station;

determining that a source of the first digital signature is the short-term key manager; and computing the short-term key using the first value and the public key provided that the short-term key manager is determined to have been the source of the first digital signature, wherein the mobile equipment accesses the content using the short-term key.

2. The method of claim 1, wherein the first value is determined by the short-term key manager.

3. The method of claim 1, wherein the first value includes a time stamp.

4. The method of claim 1, further comprising transmitting the computed short-term key from the secure memory to the mobile equipment.

5. A method of obtaining an encryption key in a communication system for point-to-multipoint transmission of content to mobile stations, the method comprising:

receiving a packet index value and a first digital signature from a short-term key manager of the communication system for point-to-multipoint transmission of content to mobile stations, wherein the first digital signature is formed from a private key;

verifying the first digital signature using a signature scheme based on the private key and a public key, wherein the public key is stored in a first secure memory of a receiving mobile station and the signature scheme is stored in the first secure memory, and wherein the public key stored in the secure memory is not accessible to a mobile equipment of the receiving mobile station;

determining that a source of the digital signature is the short-term key manager; and computing an encryption key using the packet index value and the public key provided that the short-term key manager is determined to have been the source of the first digital signature, wherein the mobile equipment accesses the content using the encryption key.

6. The method of claim 5, wherein the packet index value includes a sequence number.

7. The method of claim 5, further comprising transmitting the encryption key to the mobile equipment.

8. An integrated circuit, comprising:

means for verifying a first digital signature using a signature scheme based on a private key and a public key, wherein the public key is stored in a first secure memory of the integrated circuit and the signature scheme is stored in the first secure memory, wherein the first digital signature is provided by a short-term key manager of a communication system for point-to-multipoint transmission of content to mobile stations, wherein the digital signature is formed using the private key, and wherein the public key stored in the secure memory is not accessible to a mobile equipment of the integrated circuit;

means for determining that a source of the first digital signature is the short-term key manager; and means for computing a short-term key using a first value and the public key provided that the short-term key manager is determined to have been the source of the first digital signature, wherein the first value is provided by the short-term key manager, and wherein the mobile equipment accesses the content using the short-term key.

9. The integrated circuit of claim 8, wherein the first value is determined by the short-term key manager.

10. The integrated circuit of claim 8, wherein the first value includes a time stamp.

11. A mobile station, comprising:

means for receiving a first value and a first digital signature from a short-term key manager of a communication system for point-to-multipoint transmission of content to mobile stations, wherein the first digital signature is formed from a private key;

means for verifying the first digital signature using a signature scheme based on the private key and a public key;

means for storing the public key in a first secure memory of the mobile station, wherein the public key stored in the secure memory is not accessible to a mobile equipment of the mobile station;

means for storing the signature scheme in the first secure memory;

means for determining that a source of the first digital signature is the short-term key manager; and means for computing a short-term key using the first value and the public key provided that the short-term key manager is determined to have been the source of the first digital signature, wherein the mobile equipment accesses the content using the short-term key.

12. The mobile station of claim 11, wherein the first value is determined by the short-term key manager.

13. The mobile station of claim 11, wherein the first value includes a time stamp.

14. A non-transitory computer readable medium embodying a method for securely obtaining a short-term key for accessing content using a mobile station in a communication system for point-to-multipoint transmission of content to mobile stations, the method comprising:

receiving a first value and a first digital signature from a short-term key manager of the communication system for point-to-multipoint transmission of content to mobile stations, wherein the first digital signature is formed from a private key;

verifying the first digital signature using a signature scheme based on the private key and a public key, wherein the public key is stored in a first secure memory of a receiving mobile station and the signature scheme is stored in the first secure memory, and wherein the public key stored in the secure memory is not accessible to a mobile equipment of the receiving mobile station;

determining that a source of the first digital signature is the short-term key manager; and computing the short-term key using the first value and the public key provided that the short-term key manager is determined to have been the source of the first digital signature, wherein the mobile equipment accesses the content using the short-term key.

15. The non-transitory computer readable medium of claim 14, wherein the first value includes a time stamp.

16. An integrated circuit, comprising:

means for verifying a first digital signature using a signature scheme based on a private key and a public key, wherein the public key is stored in a first secure memory of the integrated circuit and the signature scheme is stored in a first secure memory, wherein the first digital signature is provided by a short-term key manager of a communication system for point-to-multipoint transmission of content to mobile stations, wherein the first digital signature is formed from the private key; and wherein the public key stored in the secure memory is not accessible to a mobile equipment of the integrated circuit;

means for determining that a source of the digital signature is the short-term key manager; and means for computing an encryption key using a packet index value and the public key provided that the short-term key manager is determined to have been the source of the first digital signature, wherein the packet index value is provided by the short-term key manager, and wherein the mobile equipment accesses the content using the encryption key.

17. The integrated circuit of claim 16, wherein the packet index value includes a sequence number.

18. A mobile station, comprising:
means for receiving a packet index value and a first digital signature from a short-term key manager of a communication system for point-to-multipoint transmission of content to mobile stations, wherein the first digital signature is formed from a private key;
means for verifying the first digital signature using a signature scheme based on the private key and a public key;
means for storing the public key in a first secure memory of the mobile station, wherein the public key stored in the first secure memory is not accessible to a mobile equipment of the mobile station;
means for storing the signature scheme in the first secure memory;
means for determining that a source of the first digital signature is the short-term key manager; and
means for computing an encryption key using the packet index value and the public key provided that the short-term key manager is determined to have been the source of the first digital signature, wherein the mobile equipment accesses the content using the encryption key.

19. The mobile station of claim 18, wherein the packet index value includes a sequence number.

20. A non-transitory computer readable medium embodying a method for obtaining an encryption key in a communication system for point-to-multipoint transmission of content to mobile stations, the method comprising:
receiving a packet index value and a first digital signature from a short-term key manager of the communication system for point-to-multipoint transmission of content to mobile stations, wherein the first digital signature is formed from a private key;
verifying the first digital signature using a signature scheme based on the private key and a public key, wherein the public key is stored in a first secure memory of a receiving mobile station and the signature scheme is stored in the first secure memory, and wherein the public key stored in the secure memory is not accessible to a mobile equipment of the receiving mobile station;
determining that a source of the digital signature is the short-term key manager; and
computing an encryption key using the packet index value and the public key provided that the short-term key manager is determined to have been the source of the first digital signature, wherein the mobile equipment accesses the content using the encryption key.

21. The non-transitory computer readable medium of claim 20, wherein the packet index value includes a sequence number.

22. A mobile station, comprising: a mobile equipment configured to:
receive a packet index value and a first digital signature from a short-term key manager of a communication system for point-to-multipoint transmission of content to mobile stations, wherein the first digital signature is formed from a private key, and
access the content using an encryption key; and a memory module configured to:
verify the first digital signature using a signature scheme based on the private key and a public key,
store the public key, wherein the public key stored in the memory module is not accessible to the mobile equipment of the mobile station,
store the signature scheme,
determine that a source of the first digital signature is the short-term key manager, and
compute the encryption key using the packet index value and the public key provided that the short-term key manager is determined to have been the source of the first digital signature.

23. The mobile station of claim 22, wherein the packet index value includes a sequence number.

24. A mobile station, comprising:
a mobile equipment configured to:
receive a first value and a first digital signature from a short-term key manager of a communication system for point-to-multipoint transmission of content to mobile stations, wherein the first digital signature is formed from a private key, and
access the content using a short-term key; and a memory module configured to:
verify the first digital signature using a signature scheme based on the private key and a public key,
store the public key, wherein the public key stored in the memory module is not accessible to the mobile equipment of the mobile station,
store the signature scheme,
determine that a source of the first digital signature is the short-term key manager, and
compute the short-term key using the first value and the public key provided that the short-term key manager is determined to have been the source of the first digital signature.

25. The mobile station of claim 24, wherein the first value is determined by the short-term key manager.

26. The mobile station of claim 24, wherein the first value includes a time stamp.

* * * * *